US012257206B2

(12) United States Patent
Nilsson et al.

(10) Patent No.: US 12,257,206 B2
(45) **Date of Patent: *Mar. 25, 2025**

(54) CPR CHEST COMPRESSION MACHINE ADJUSTING MOTION-TIME PROFILE IN VIEW OF DETECTED FORCE

(71) Applicant: PHYSIO-CONTROL, INC., Redmond, WA (US)

(72) Inventors: Anders Nilsson, Lund (SE); Jonas Lagerstrom, Fagersanna (SE); Bo Mellberg, Lund (SE); Anders Jeppsson, Lund (SE); Marcus Ehrstedt, Lund (SE); Bjarne Madsen Hardig, Lund (SE); Fredrik Arnwald, Lomma (SE); Erik von Schenck, Lomma (SE); Paul Rasmusson, Furulund (SE); Sara Lindroth, Lund (SE); Fred Chapman, Newcastle, WA (US); Ryan Landon, Redmond, WA (US); Mitchell A. Smith, Sammamish, WA (US); Steven B. Duke, Bothell, WA (US); Krystyna Szul, Seattle, WA (US); Gregory T. Kavounas, Bellevue, WA (US)

(73) Assignee: PHYSIO-CONTROL, INC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,637

(22) Filed: Jul. 13, 2023

(65) Prior Publication Data

US 2023/0355468 A1 Nov. 9, 2023

Related U.S. Application Data

(63) Continuation of application No. 17/238,627, filed on Apr. 23, 2021, now Pat. No. 11,723,834, which is a (Continued)

(51) Int. Cl.
*A61H 31/00* (2006.01)

(52) U.S. Cl.
CPC ..... *A61H 31/006* (2013.01); *A61H 2031/001* (2013.01); *A61H 2031/002* (2013.01); (Continued)

(58) Field of Classification Search
CPC .................. A61H 9/005; A61H 9/0057; A61H 2009/0064; A61H 23/00; A61H 31/00; (Continued)

(56) References Cited

U.S. PATENT DOCUMENTS 261,394 A 7/1882 Slater
2,036,248 A 4/1936 Acklen
(Continued)

FOREIGN PATENT DOCUMENTS

EP 1997469 A1 12/2008
EP 2647365 A1 10/2013
(Continued)

OTHER PUBLICATIONS

Extended European Search Report issued in European Patent Application No. 22179829.1, mailed Oct. 7, 2022, 5 pages.
(Continued)

*Primary Examiner* — Colin W Stuart
(74) *Attorney, Agent, or Firm* — Miller Nash LLP

(57) ABSTRACT

A CPR machine (100) is configured to perform, on a patient's (182) chest, compressions that alternate with releases. The CPR machine includes a compression mechanism (148), and a driver system (141) configured to drive the compression mechanism. A force sensing system (149) may sense a compression force, and the driving can be adjusted accordingly if there is a surprise. For instance, driving may have been automatic according to a motion-time profile, which is adjusted if the compression force is not as expected (850). An optional chest-lifting device (152) may lift the chest between the compressions, to assist actively the
(Continued)

decompression of the chest. A lifting force may be sensed, and the motion-time profile can be adjusted if the compression force or the lifting force is not as expected.

15 Claims, 22 Drawing Sheets

Related U.S. Application Data continuation of application No. 15/527,294, filed as application No. PCT/US2015/060926 on Nov. 16, 2015, now Pat. No. 11,013,660, which is a continuation of application No. 14/616,056, filed on Feb. 6, 2015, now Pat. No. 10,292,899.

(60) Provisional application No. 62/080,969, filed on Nov. 17, 2014.

(52) U.S. Cl.
CPC ...... *A61H 2031/003* (2013.01); *A61H 31/007* (2013.01); *A61H 2201/0103* (2013.01); *A61H 2201/0176* (2013.01); *A61H 2201/0184* (2013.01); *A61H 2201/0188* (2013.01); *A61H 2201/1246* (2013.01); *A61H 2201/5012* (2013.01); *A61H 2201/5043* (2013.01); *A61H 2201/5046* (2013.01); *A61H 2201/5058* (2013.01); *A61H 2201/5061* (2013.01); *A61H 2201/5064* (2013.01); *A61H 2201/5071* (2013.01); *A61H 2201/5084* (2013.01); *A61H 2201/5097* (2013.01); *A61H 2230/207* (2013.01); *A61H 2230/255* (2013.01); *A61H 2230/405* (2013.01)

(58) Field of Classification Search
CPC .. A61H 31/004; A61H 31/005; A61H 31/006; A61H 31/007; A61H 31/008; A61H 2031/001; A61H 2031/002; A61H 2031/003; A61H 2205/08; A61H 2205/084; A61H 2201/0173; A61H 2201/0176; A61H 2201/0184; A61H 2201/1619; A61H 2201/50; A61H 2201/501; A61H 2201/5007; A61H 2201/5012; A61H 2201/5023; A61H 2201/5051; A61H 2201/5056; A61H 2201/5053; A61H 2201/5058; A61H 2201/5061; A61H 2201/5064; A61H 2201/5071; A61H 2201/5079; A61H 2201/5084
See application file for complete search history.

(56) References Cited

U.S. PATENT DOCUMENTS

| | | | | |
|---|---|---|---|---|
| 5,261,394 | A | 11/1993 | Mulligan et al. | |
| 5,490,820 | A | 2/1996 | Schock et al. | |
| 5,645,522 | A | 7/1997 | Lurie et al. | |
| 6,587,726 | B2 | 7/2003 | Lurie et al. | |
| 7,008,388 | B2 | 3/2006 | Sherman et al. | |
| 7,308,304 | B2 | 12/2007 | Hampton et al. | |
| 7,569,021 | B2 | 8/2009 | Sebelius et al. | |
| 7,747,319 | B2 | 6/2010 | Freeman | |
| 7,841,996 | B2 | 11/2010 | Sebelius et al. | |
| 8,007,451 | B2 | 8/2011 | Håvardsholm et al. | |
| 8,147,434 | B2 | 4/2012 | Mollenauer et al. | |
| 8,366,645 | B1 | 2/2013 | Belalcazar | |
| 10,292,899 | B2 | 5/2019 | Nilsson et al. | |
| 11,723,834 | B2 * | 8/2023 | Nilsson | A61H 31/006 601/41 |
| 2002/0177793 | A1 | 11/2002 | Sherman et al. | |
| 2004/0030272 | A1 | 2/2004 | Kelly et al. | |
| 2004/0058305 | A1 | 3/2004 | Lurie et al. | |
| 2004/0082888 | A1 | 4/2004 | Palazzolo et al. | |
| 2004/0230140 | A1 | 11/2004 | Steen | |
| 2006/0089574 | A1 | 4/2006 | Paradis | |
| 2006/0094991 | A1 | 5/2006 | Walker | |
| 2007/0093731 | A1 | 4/2007 | Warwick et al. | |
| 2008/0146974 | A1 | 6/2008 | Lund et al. | |
| 2009/0062701 | A1 | 3/2009 | Yannopoulos et al. | |
| 2010/0004571 | A1 | 1/2010 | Nilsson et al. | |
| 2010/0185127 | A1 | 7/2010 | Nilsson et al. | |
| 2010/0198117 | A1 | 8/2010 | Itnati | |
| 2010/0198118 | A1 | 8/2010 | Itnati | |
| 2010/0312153 | A1 | 12/2010 | McIntyre et al. | |
| 2011/0092864 | A1 | 4/2011 | Woerlee et al. | |
| 2012/0016179 | A1 | 1/2012 | Paradis et al. | |
| 2012/0016279 | A1 | 1/2012 | Banville et al. | |
| 2012/0203147 | A1 | 8/2012 | Lurie et al. | |
| 2012/0226204 | A1 | 9/2012 | Coleman et al. | |
| 2012/0259156 | A1 | 10/2012 | Freeman | |
| 2012/0330199 | A1 | 12/2012 | Lurie et al. | |
| 2012/0330200 | A1 | 12/2012 | Voss et al. | |
| 2013/0053649 | A1 | 2/2013 | Elghazzawi et al. | |
| 2013/0079684 | A1 | 3/2013 | Rosen et al. | |
| 2013/0218056 | A1 | 8/2013 | Aelen et al. | |
| 2013/0282069 | A1 | 10/2013 | Thiagarajan et al. | |
| 2013/0324894 | A1 | 12/2013 | Herken et al. | |
| 2014/0066822 | A1 | 3/2014 | Freeman | |
| 2014/0066824 | A1 | 3/2014 | Johnson | |
| 2014/0088467 | A1 | 3/2014 | Parascandola et al. | |
| 2014/0094724 | A1 | 4/2014 | Freeman | |
| 2014/0135666 | A1 | 5/2014 | Butler et al. | |
| 2014/0155792 | A1 | 6/2014 | Karve et al. | |
| 2014/0171840 | A1 | 6/2014 | Aelen et al. | |
| 2014/0180180 | A1 | 6/2014 | Nilsson et al. | |
| 2014/0221882 | A1 | 8/2014 | Jeppsson | |
| 2014/0276269 | A1 | 9/2014 | Illindala | |
| 2015/0094617 | A1 | 4/2015 | Aelen et al. | |
| 2015/0119768 | A1 | 4/2015 | Meier et al. | |
| 2015/0257971 | A1 | 9/2015 | Chapman et al. | |
| 2015/0272822 | A1 | 10/2015 | Wik et al. | |
| 2015/0328083 | A1 | 11/2015 | Delisle et al. | |
| 2016/0136042 | A1 | 5/2016 | Nilsson et al. | |
| 2016/0143804 | A1 | 5/2016 | Nilsson et al. | |
| 2016/0296419 | A1 | 10/2016 | Paulussen et al. | |
| 2016/0317385 | A1 | 11/2016 | Salcido et al. | |
| 2017/0156977 | A1 | 6/2017 | Walden et al. | |

FOREIGN PATENT DOCUMENTS

| | | | |
|---|---|---|---|
| WO | 2010004499 | A1 | 1/2010 |
| WO | 2012063163 | A1 | 5/2012 |
| WO | 2014051934 | A1 | 4/2014 |
| WO | 2016081381 | A1 | 5/2016 |

OTHER PUBLICATIONS

International Preliminary Report on Patentability mailed May 23, 2017, Appl. No. PCT/US2015/060926; filed Nov. 16, 2015.
PCT Int'l Search Report & Written Opinion dated Mar. 17, 2016; Appl. No. PCT/US2015/060926; filed Nov. 16, 2015; 16 pages.
Extended European Search Report issued in European Patent Application No. 23191586, mailed Nov. 24, 2023, 5 pages.
Extended European Search Report issued Jun. 25, 2018, in European Patent Application No. 15861123.6, 7 pages.
Extended European Search Report issued May 14, 2024, in European Patent Application No. 24159654.3, 5 pages.
Extended European Search Report issued in European Patent Application No. 24193156.7, mailed Nov. 6, 2024, 6 pages.

* cited by examiner

COMPONENTS OF CPR MACHINE

*CPR CHEST COMPRESSION WITH FORCE DETECTION*

ADJUSTING COMPRESSION DEPTH

*ADJUSTING FOR DIMINISHED CHEST RESTING HEIGHT*

*CPR CHEST COMPRESSION & ACTIVE DECOMPRESSION*

ADJUSTING DECOMPRESSION MAXIMUM HEIGHT

ADJUSTING FOR DETACHMENT

*METHODS*

COMPRESSION MECHANISM WITH FAILURE DETECTOR

COMPRESSION MECHANISM WITH FAILURE DETECTOR

*METHODS*

*METHODS*

CPR CHEST COMPRESSION MACHINE
WITH CHEST- LIFTING TETHERS

CPR CHEST COMPRESSION MACHINE
WITH CHEST- LIFTING TETHERS

CPR CHEST COMPRESSION MACHINE WITH CHEST- LIFTING TETHERS

CPR CHEST COMPRESSION MACHINE WITH CHEST- LIFTING TETHERS

CPR CHEST COMPRESSION MACHINE WITH CHEST- LIFTING BLADDERS

CPR CHEST COMPRESSION MACHINE WITH CHEST- LIFTING BLADDERS

CHEST LIFTED ONLY OCCASSIONALLY BETWEEN CHEST COMPRESSIONS

LIFTING CHEST TO ASCENDING HEIGHTS BETWEEN COMPRESSIONS

LIFTING CHEST TO ASCENDING HEIGHTS & COMPRESSING TO DESCENDING DEPTHS

LIFTING CHEST TO ASCENDING HEIGHTS & COMPRESSING TO DESCENDING DEPTHS

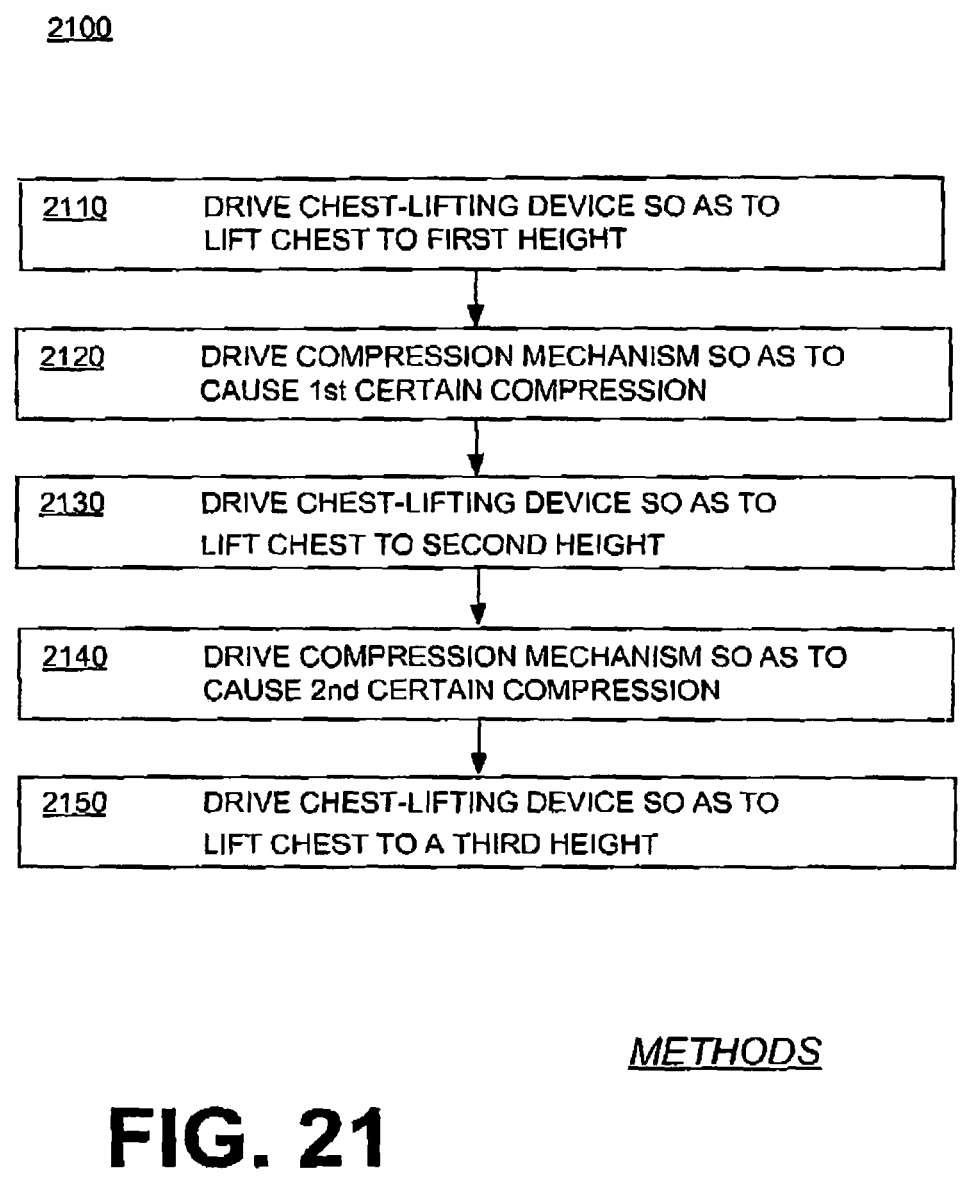

2100

2110 DRIVE CHEST-LIFTING DEVICE SO AS TO LIFT CHEST TO FIRST HEIGHT

↓

2120 DRIVE COMPRESSION MECHANISM SO AS TO CAUSE 1st CERTAIN COMPRESSION

↓

2130 DRIVE CHEST-LIFTING DEVICE SO AS TO LIFT CHEST TO SECOND HEIGHT

↓

2140 DRIVE COMPRESSION MECHANISM SO AS TO CAUSE 2nd CERTAIN COMPRESSION

↓

2150 DRIVE CHEST-LIFTING DEVICE SO AS TO LIFT CHEST TO A THIRD HEIGHT

*METHODS*

FIG. 21

| SET | PARAMETER | # |
|---|---|---|
| v | HAD PRIOR COMPRESSIONS | YES |
| | DELAY TO START LIFTING (sec) | 30 |
| | FULL HEIGHT FOR LIFTING (cm) | 3 |
| | TIME TO ACHIEVE FULL HEIGHT (sec) | 30 |
| | LIFTING WAVEFORM | S-S |
| | LIFT EVERY COMPRESSION(S) | 1 |

| SET | PARAMETER | # |
|---|---|---|
| v | HAD PRIOR COMPRESSIONS | YES |
| v | DELAY TO START LIFTING (sec) | 30 |
| v | FULL HEIGHT FOR LIFTING (cm) | 3 |
| v | TIME TO ACHIEVE FULL HEIGHT (sec) | 30 |
| v | LIFTING WAVEFORM | S-S |
| v | LIFT EVERY COMPRESSION(S) | 1 |

METHODS

COMPRESSING CHEST & ALSO LIFTING CHEST WITH LIFTING DELAY

COMPRESSING CHEST & ALSO LIFTING CHEST WITH LIFTING DELAY

CPR MACHINE COOPERATING WITH MEDICAL VENTILATOR

CPR CHEST COMPRESSION MACHINE ADJUSTING MOTION-TIME PROFILE IN VIEW OF DETECTED FORCE

CROSS REFERENCE TO RELATED PATENT APPLICATIONS

This patent application is a continuation of U.S. patent application Ser. No. 17/238,627, filed Apr. 23, 2021, which is a continuation of U.S. patent application Ser. No. 15/527,294, filed May 16, 2017, now U.S. Pat. No. 11,013,660, which is a national stage filing under 35 U.S.C. § 371 filing of international application No. PCT/US2015/060926, filed Nov. 16, 2015, which is a continuation of U.S. patent application Ser. No. 14/616,056, filed Feb. 6, 2015, now U.S. Pat. No. 10,292,999, which claims priority to U.S. provisional application No. 62,080,969, filed Nov. 17, 2014, the disclosures of all of which are incorporated herein by reference in their entirety.

BACKGROUND

In certain types of medical emergencies a patient's heart stops working, which stops the blood from flowing. Without the blood flowing, organs like the brain will start being damaged, and the patient will soon die. Cardio Pulmonary Resuscitation (CPR) can forestall these risks. CPR includes performing repeated chest compressions to the chest of the patient, so as to cause the patients blood to circulate some. CPR also includes delivering rescue breaths to the patient, so as to create air circulation in the lungs. CPR is intended to merely maintain the patient until a more definite therapy is made available, such as defibrillation. Defibrillation is an electrical shock deliberately delivered to a person in the hope of restoring their heart rhythm.

For making CPR circulate blood effectively, guidelines by medical experts such as the American Heart Association provide parameters for the chest compressions. The parameters include the frequency, the depth reached, fully releasing after a compression, and so on. Frequently the depth is to exceed 5 cm (2 in.). The parameters also include instructions for the rescue breaths.

Traditionally, CPR has been performed manually. A number of people have been trained in CPR, including some who are not in the medical professions, just in case they are bystanders in an emergency event. Manual CPR might be ineffective, however. Indeed, the rescuer might not be able to recall their training, especially under the stress of the moment. And even the best trained rescuer can become fatigued from performing the chest compressions for a long time, at which point their performance might be degraded. In the end, chest compressions that are not frequent enough, not deep enough, or not followed by a full release may fail to maintain the blood circulation required to forestall organ damage and death.

The risk of ineffective chest compressions has been addressed with CPR chest compression machines. Such machines have been known by a number of names, for example CPR chest compression machines, CPR machines, mechanical CPR devices, cardiac compressors and so on.

CPR chest compression machines hold the patient supine, which means lying on his or her back. Such machines then repeatedly compress and release the chest of the patient. In fact, they can be programmed so that they will automatically compress and release at the recommended rate or frequency, and can reach a specific depth within the range recommended by the guidelines.

The repeated chest compressions of CPR are actually compressions alternating with releases. The compressions cause the chest to be compressed from its original shape. During the releases the chest is decompressing, which means that the chest is undergoing the process of returning to its original shape. This process is not immediate upon release, and it might not be completed by the time the next compression is due. In addition, the chest may start collapsing due to the repeated compressions, which means that it might not fully return to its original height, even if it had the opportunity.

Some CPR chest compression machines compress the chest by a piston. Some may even have a suction cup at the end of the piston, with which they lift the chest at least during the releases. This lifting may actively assist the chest in decompressing faster than the chest would accomplish by itself. This type of lifting is sometimes called active decompression.

Active decompression may improve air circulation in the patient, which is a component of CPR. The improved air circulation may be especially critical, given that the chest could be collapsing due to the repeated compressions, and would thus be unable by itself to intake the necessary air.

SUMMARY

The present description gives instances of CPR machines, software, and methods, the use of which may help overcome problems and limitations of the prior art.

In embodiments, a Cardio-Pulmonary Resuscitation ("CPR") machine is configured to perform on a patient's chest compressions alternating with releases. The CPR machine includes a compression mechanism configured to perform the compressions and the releases, and a driver system configured to drive the compression mechanism.

In some of these embodiments, a compression force is sensed, and the driving is adjusted accordingly if there is a surprise. For instance, driving may have been automatic according to a motion-time profile, which is adjusted if the compression force is not as expected. An optional lifting mechanism may lift the chest between the compressions, to assist actively the decompression of the chest. A lifting force may be sensed, and the motion-time profile can be adjusted if the compression force or the lifting force is not as expected. An advantage is that a changing condition in the patient or in the retention of the patient within the CPR machine may be detected and responded to.

In some of these embodiments, a chest-lifting device is included to assist actively the decompression of the chest. A failure detector may detect if the chest-lifting device fails to thus lift the chest. If such a failure is detected, the CPR machine may react accordingly. For instance, an inference may be made from the detected failure that the chest-lifting device has been detached from the patient, is malfunctioning, or its operation is obstructed. A motion-time profile of the driver may be adjusted accordingly. Or an action may be taken by an electronic component, such as a user interface, a memory or a communication module.

In some of these embodiments, the CPR machine has a retention structure and a tether coupled to the retention structure. The patient may be placed supine within the retention structure. The retention structure can be configured to retain the patient supine, while the compressions are performed. The tether may lift the chest when the compressions are not being performed. An advantage is that the decompression of the chest is thus assisted actively.

In some embodiments, the CPR machine has a retention structure, a chest-lifting inflatable bladder coupled to the retention structure, and a fluid pump configured to inflate the bladder. Inflating the bladder may lift the chest when the compressions are not being performed. An advantage is that the decompression of the chest can be thus assisted actively, even in CPR machines where the compression mechanism does not use a piston whose operation can be reversed.

In some embodiments, a chest-lifting device is included so as to assist actively the decompression of the chest. The driver system is configured to drive the compression mechanism and to cause the chest-lifting device to lift the chest above its resting height. The lifting may be performed while none of the compressions is being performed, and only occasionally, for example only once while four or more successive compressions are performed. An advantage is that sets of successive compressions may be performed at proper speed, while the equivalent of a rescue breath may be delivered in between.

In some embodiments, a chest-lifting device is included so as to assist actively the decompression of the chest. The driver system is configured to drive the compression mechanism, and further to cause the chest-lifting device to lift the chest above its resting height. The lifting may be performed to various heights, such as progressively increasing heights or adjustable heights. The heights may be set specifically for the patient, whether by detecting the patient's resting height or by a user interface. An advantage is that therapy can thus be customized to the patient.

In some embodiments, a chest-lifting device is included so as to assist actively the decompression of the chest. The driver system is configured to drive the compression mechanism, and further to cause the chest-lifting device to lift the chest above its resting height. Lifting the chest may start after a lifting delay compared to compressions from the compression mechanism.

In some embodiments, a chest-lifting device is included so as to assist actively the decompression of the chest. In addition, the CPR machine includes a communication module and may cooperate with a ventilator. The CPR machine and the ventilator may exchange signals as to synchronize when the chest will be lifted with an infusion of air from the ventilator.

In some embodiments, the compression mechanism includes a piston that is coupled to a retention structure. A position sensor detects the resting height of the patient's chest. In some embodiments, then, the CPR machine is capable of adjusting the compression depth in view of the size of the patient. For example, if the patient's body is larger than a threshold, the chest has a higher resting height, and the compressions are correspondingly deeper.

In some embodiments, a chest-lifting device and an input mechanism are also provided, and the compression mechanism includes a piston. A size value for a size of the patient may be input by the input mechanism, for example by a rescuer. In softie embodiments, then, the CPR machine is capable of adjusting the active decompression height achieved by the lifting, in view of the size of the patient. For example, if the patient's body is larger than a threshold, the chest has a higher resting height, and the active decompression fittings above the resting height are correspondingly higher.

These and other features and advantages of this description will become more readily apparent from the Detailed Description, which proceeds with reference to the associated drawings in which:

BRIEF DESCRIPTION OF THE DRAWINGS

FIG. 21 is a flowchart for illustrating methods according to embodiments.

DETAILED DESCRIPTION

As has been mentioned, the present description is about Cardio-Pulmonary Resuscitation ("CPR") chest compression machines, methods and software that can perform automatically CPR chest compressions on a patient. Embodiments are now described in more detail.

Figure 1:
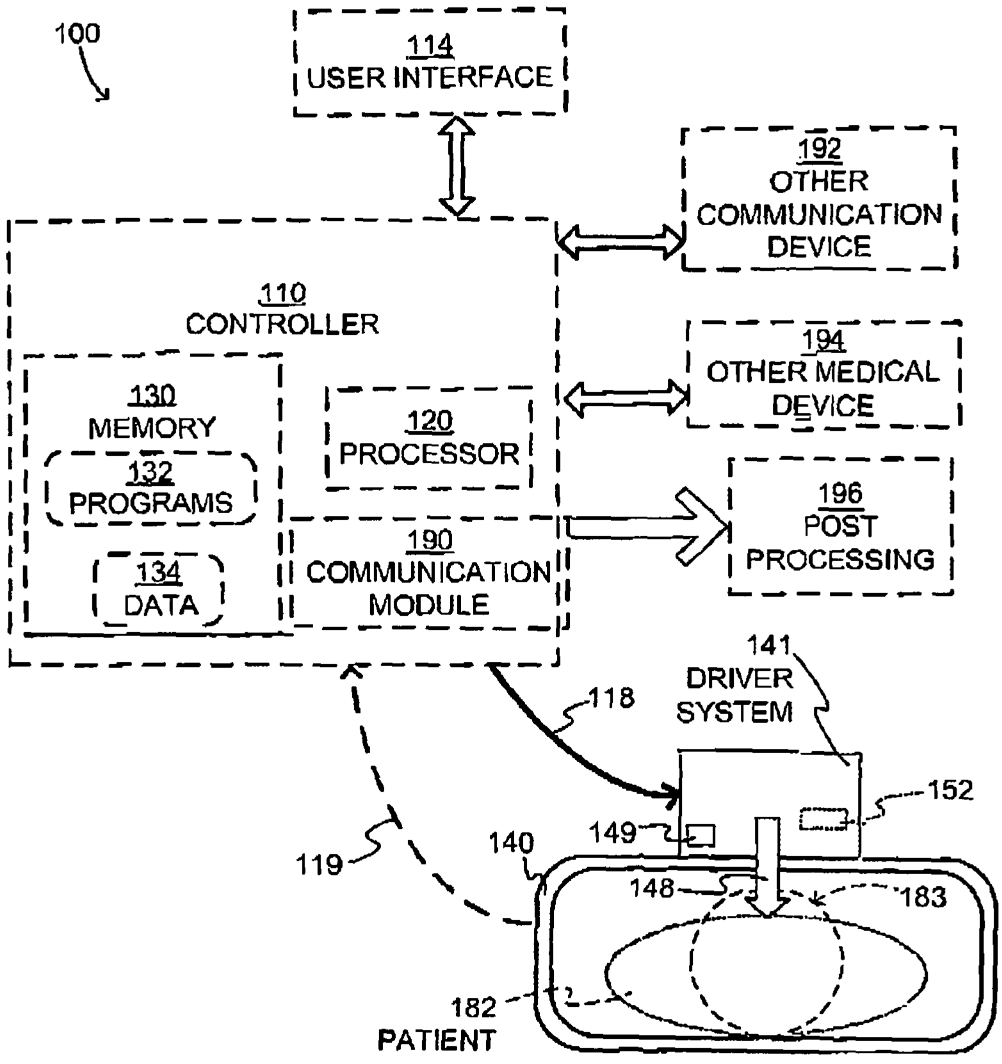
FIG. 1 is a diagram of components of an abstracted CPR machine made according to embodiments.

FIG. 1 is a diagram of components 100 of an abstracted CPR machine according to embodiments. The abstracted CPR machine can be configured to perform on a chest of a supine patient 182 compressions alternating with releases.

Components 100 include a back plate 139. In FIG. 1 an abstracted version of back plate 139 is shown. Patient 182 may be placed supine on back plate 139. A midpoint 138 of back plate 139 is also shown. An elevation axis 137 starts from midpoint 138, and will be used for determining a resting height of the chest, etc.

Back plate 139 is typically part of a retention structure. An abstracted retention structure 140 of a CPR chest compression machine is shown in FIG. 1. Patient 182 is placed supine within retention structure 140. Retention structure 140 retains the body of patient 182 on back plate 139. While retention structure 140 typically reaches the chest and the back of patient 182, it does not reach the head 183.

Retention structure 140 may be implemented in a number of ways. Good embodiments are disclosed in U.S. Pat. No. 7,569,021 to Jolife AB which is incorporated by reference; such embodiments are being sold by Physio-Control, Inc. under the trademark LUCAS®. In other embodiments retention structure 140 includes a backboard, of which back plate 139 is a part, and a belt that can be placed around the patient's chest.

Components 100 also include a compression mechanism 148. Compression mechanism 148 can be configured to perform the compressions to the chest, and then the releases after the decompressions.

Components 100 also include a driver system 141. Driver system 141 can be configured to drive compression mechanism 148 automatically. This driving may cause the compressions and the releases to be performed repeatedly.

Compression mechanism 148 and driver system 141 may be implemented in combination with retention structure 140 in a number of ways. In the above mentioned example of U.S. Pat. No. 7,569,021 compression mechanism 148 includes a piston, and driver system 141 includes a rack-and-pinion mechanism. The piston is also called a plunger. In embodiments where retention structure 140 includes a belt, compression mechanism 148 may include a spool for collecting and releasing the belt so as to correspondingly squeeze and release the patient's chest, and driver system 141 can include a motor for driving the spool with respect to the back plate.

Components 100 may further include a controller 110. Driver system 141 may be controlled by a controller 110 according to embodiments. Controller 110 may include a processor 120. Processor 120 can be implemented in a number of ways, such as with a microprocessor, Application Specific Integration Circuits (ASICs), programmable logic circuits, general processors, etc. While a specific use is described for processor 120, it will be understood that processor 120 can either be standalone for this specific use, or also perform other acts, operations or process steps.

In some embodiments controller 110 additionally includes a memory 130 coupled with processor 120. Memory 130 can be implemented by one or more memory chips. Memory 130 can be a non-transitory storage medium that stores programs 132, which contain instructions for machines. Programs 132 can be configured to be read by processor 120, and be executed upon reading. Executing is performed by physical manipulations of physical quantities, and may result in functions, processes, actions, operations and/or methods to be performed, and/or processor 120 to cause other devices or components to perform such functions, processes, actions, operations anchor methods. Often, for the sake of convenience only, it is preferred to implement and describe a program as various interconnected distinct software modules or features, individually and collectively also known as software. This is not necessary, however, and there may be cases where modules are equivalently aggregated into a single program. In some instances, software is combined with hardware in a mix called firmware.

While one or more specific uses are described for memory 130, it will be understood that memory 130 can further hold additional data 134, such as event data, patient data, data of the CPR machine, and so on. For example, data gathered according to embodiments could be aggregated in a database over a period of months or years and used to search for evidence that one pattern or another of CPR is consistently better (in terms of a criterion) than the others, of course correlating with the patient. Data could be de-identified so as to protect the patient privacy. If so, this could be used to adapt the devices to use that pattern either continuously or at least as one of their operating modes.

Controller 110 may include or cooperate with a communication module 190, which may communicate with other modules or functionalities wirelessly, or via wires. Controller 110 may include or be communicatively coupled with a User Interface 114, for receiving user instructions and settings, for outputting data, for alerting the rescuer, etc.

Communication module 190 may further be communicatively coupled with an other communication device 192, an other medical device 194, and also transmit data 134 to a post-processing module 196. Wireless communications may be by Bluetooth, Wi-Fi, cellular, near field, etc. Data 134 may also be transferred via removable storage such as a flash drive. Other communication device 192 can be a mobile display device, such as a tablet or smart phone. Other medical device 194 can be a defibrillator, monitor, monitor-defibrillator, ventilator, capnography device, etc.

In other embodiments, communication module 190 can be configured to receive transmissions from such other devices or networks. Therapy can be synchronized, such as ventilation or defibrillation shocks with the operation of the CPR machine. For example, the CPR machine may pause its operations for delivery of a defibrillation shock, afterwards detection of ECG, and whether operation needs to be restarted. If the defibrillation shock has been successful, then operation of the CPR machine might not need to be restarted.

Post-processing module 196 may include a medical system network in the cloud, a server such as in the LIFENET® system, etc. Data 134 can then be used in post event analysis to determine how the CPR machine was used, whether it was used properly, and to find ways to improve performance, training, etc.

Controller 110 can be configured to control driver system 141 according to embodiments. Controlling is indicated by arrow 118, and can be implemented by wired or wireless signals and so on. Accordingly, compressions can be performed on the chest of patient 182 as controlled by controller 110.

In some embodiments, one or more physiological parameters of patient 182 are sensed, for example measured end tidal CO2, ROSC detection, pulse oximetry, etc. Upon a physiological parameter being sensed, a value of it can be transmitted to controller 110, as is suggested via arrow 119. Transmission can be wired or wireless. The transmitted values may further affect how controller 110 controls driver system 141.

Controller 110 may be implemented together with retention structure 140, in a single CPR chest compression machine. In such embodiments, arrows 118, 119 are internal to such a CPR chest compression machine. Alternately, controller 110 may be hosted by a different machine, which communicates with the CPR chest compression machine that uses retention structure 140. Such communication can be wired or wireless. The different machine can be any kind of device, such as other communication device 192 or other medical device 194. One example is described in U.S. Pat. No. 7,308,304, titled "COOPERATING DEFIBRILLATORS AND EXTERNAL CHEST COMPRESSION MACHINES," the description of which is incorporated by reference. Similarly, User Interface 114 may be implemented on the CPR chest compression machine, or on another device.

In embodiments, the compressions are performed automatically in one or more series, and perhaps with pauses between them, as controlled by controller 110. A single resuscitation event can be sets of compressions for a single patient.

Driver system 141 can be configured to drive the compression mechanism automatically according to a motion-time profile. The motion-time profile can be such that the driving can cause the compression mechanism to repeatedly perform the compressions and the releases. The chest can be compressed downward from the resting height for the compressions, and then decompress at least partially during the releases. Several of the compressions can thus compress the patient's chest by at least 2 cm downward from the resting height, and frequently more, such as 5 cm or 6 cm.

In some embodiments, a force sensing system 149 is included. In embodiments, force sensing system 149 can be configured to sense an amount of a compression force exerted by driver system 141 when the chest of the patient has been compressed downward by a certain amount from the resting height. That certain amount can be, for example, 1 cm, 2 cm or more.

Force sensing system 149 may be implemented in different ways, depending on the rest of the embodiments. For example, if may include a force sensor. Or, it may include a strain gauge or a measuring spring with a known spring constant. Such a strain gauge or a measuring spring can be coupled between compression mechanism 148 and driver system 141 or retention structure 140. In some embodiments the driver system operates by receiving an electrical current, and the force sensing system includes an electrical detector configured to detect an amount of the electrical current. In some embodiments, force sensing system 149 includes an accelerometer, a force-sensing resistor, a piezoelectric force sensor, a pressure sensor within a suction cup and/or in a back plate of retention structure 140. In some embodiments, force sensing system 149 measures a difference between forces, and infers a force on the patient. In some embodiments a force on a patient stabilization strap is measured, which may have a lateral component, for example from the patient shifting within retention structure 140.

Figure 2:
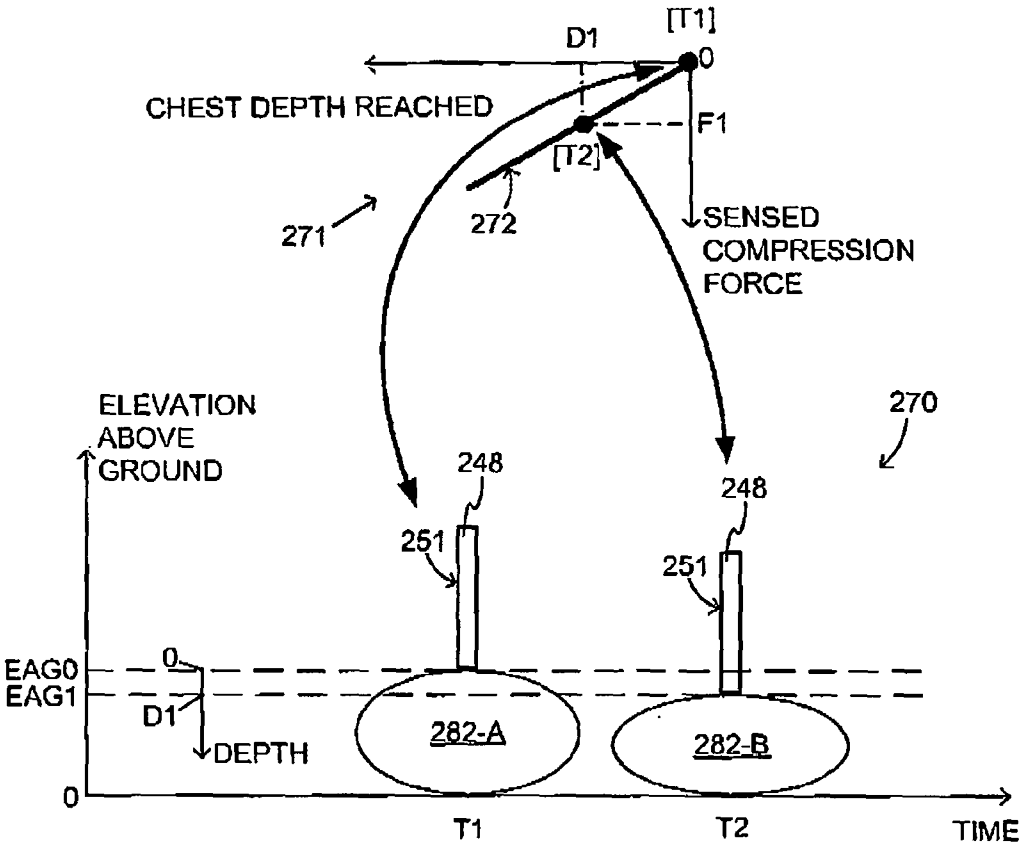
FIG. 2 is a composite diagram showing sample positions of a compression mechanism of a CPR machine at different times according to embodiments, where force may be detected.

FIG. 2 is a composite diagram made by individual diagrams 270 and 271, which are bridged by thick curved arrows for easier comprehension. At the bottom is a diagram 270 with a horizontal time axis. A major vertical axis indicates elevation above ground, for those times T1, T2. In the case of FIG. 2, the ground is a convenient reference elevation level, which has the vertical elevation value of 0. Other reference elevation levels may be used; for example, when the patient is placed supine within a retention structure, then the reference elevation level may be defined with respect to the retention structure. For instance, if the retention structure includes back plate 139 (of FIG. 1) on which the patient's back is placed, then the reference elevation level may be midpoint 138 of the back plate, and the vertical axis corresponds to axis 137. Or, the reference elevation level may be another effective level if the retention structure cradles the patent's torso also from the sides, etc.

In diagram 270, torso cross-sections 282-A and 282-B are shown supine on the ground, or on a back plate, at times T1, T2, respectively. A sample compression mechanism 248 includes a piston 251, although a different compression mechanism 248 may be used.

The height of the patient's chest may be measured from the top part of the torso when the patient is supine. The patient's chest may have a resting height above the reference elevation level. The resting height can be determinable at a moment when none of the compressions is being performed by the CPR machine.

At time T1, piston 251 merely contacts torso cross-section 282-A at the top, without a compression being performed. The bottom of piston 251 is at elevation level EAG0, which is sometimes called the zero point or zero position of the travel. The travel is also known as stroke and displacement. The chest resting height is thus at EAG0.

At time T2, compression mechanism 248 is performing a compression, which means that piston 251 presses into torso cross-section 282-B. The chest now is compressed, and has an elevation level EAG1 that is less than EAG0.

In embodiments Where the compression mechanism is caused to repeatedly perform the compressions and the releases, the positions of times T1 and T2 would alternate repeatedly. In diagram 270, a minor vertical axis 275 indicates depth, meaning depth of compressions. Its zero point is level EAG0 of the major vertical axis. Compression depth may be measured downward from the resting height in the minor vertical axis. At time T1 the depth is 0. At time T2 the depth is D1. Depth D1 can be 0.5 cm, 1 cm, 2 cm, the maximum depth reached that is also known as the full depth (FD), etc.

In such embodiments, the force sensing system can be configured to sense an amount of a compression force exerted by the driver system when the chest has been compressed downward by a certain amount from the resting height, for example at least 1 cm.

An example is shown in a diagram 271 of FIG. 2, where sensing is at more points. The horizontal axis measures, in the direction to the left, the chest depth reached. Similarly, in diagram 270, a minor vertical axis 275 measures, in a downward direction, the chest depth reached. In diagram 271 the vertical axis measures, in a downward direction, the compression force that is sensed by force sensing system 149. The origin of diagram 271 corresponds to time T1. As time passes, the force increases during a compression. At time T2, as the depth has become D1, the force has become F1. The more time passes thereafter, the more force is sensed. A line 272 is plotted accordingly, during the compression. The force can be measured for one or more points in the travel, and inferred for others, to arrive at line 272. Inferring for points of interest may be performed, for example, by interpolation. (It should be noted that line 272 might not be repeated for a release. Indeed, if the release of piston 251 is faster than the decompressing speed of the chest, no force will be measured, and a different line may be traced in diagram 271.)

In such embodiments, the motion-time profile may be adjusted in view of the sensed amount of the compression force. An adjustment may be made if the sensed amount of the compression force represents a surprise, for example it is unexpected upon starting, or has changed since starting, etc.

Such an adjustment to the motion-time profile may be performed in a number of ways. Examples are now described where the motion-time profile is adjusted by changing a maximum depth, but other parameters can change, such as frequency, etc.

In some embodiments, the motion-time profile includes a maximum depth below the resting height, to which the chest is compressed. In such embodiments, the motion-time profile can be adjusted by adjusting the maximum depth. For example, the maximum depth may be adjusted according to the sensed amount of the compression force. The sensed amount of the compression force may communicate information about the current state of the patient that is thus taken into account. In some instances, the maximum depth may be determined by compressing the chest downward until the sensed amount of the compression force meets a compression force threshold. Such would ensure that the same force is applied to all compressions, and the maximum depth is thus determined ultimately by the patient's chest at the time.

Attention is now drawn to line 272. In FIG. 2 it is shown as linear, but that need not be the case. In embodiments, an alert condition can be met if line 272 differs from what is expected, or changes while the compressions are taking place. In embodiments, a user interface such as user interface 114 can be configured to emit an alert, if the sensed amount of the compression force meets the alert condition. The alert condition may indicate situations for which alerting is advised, such as the compressions reaching too deeply, one or more ribs breaking, the patient migrating with respect to the retention structure, or the resting height changing as the patient's chest loses its compactness due to the compressions. The alert can be an audio warning or prompt, visual indicators, and so on. Individual examples are now described for these conditions.

Figure 3:
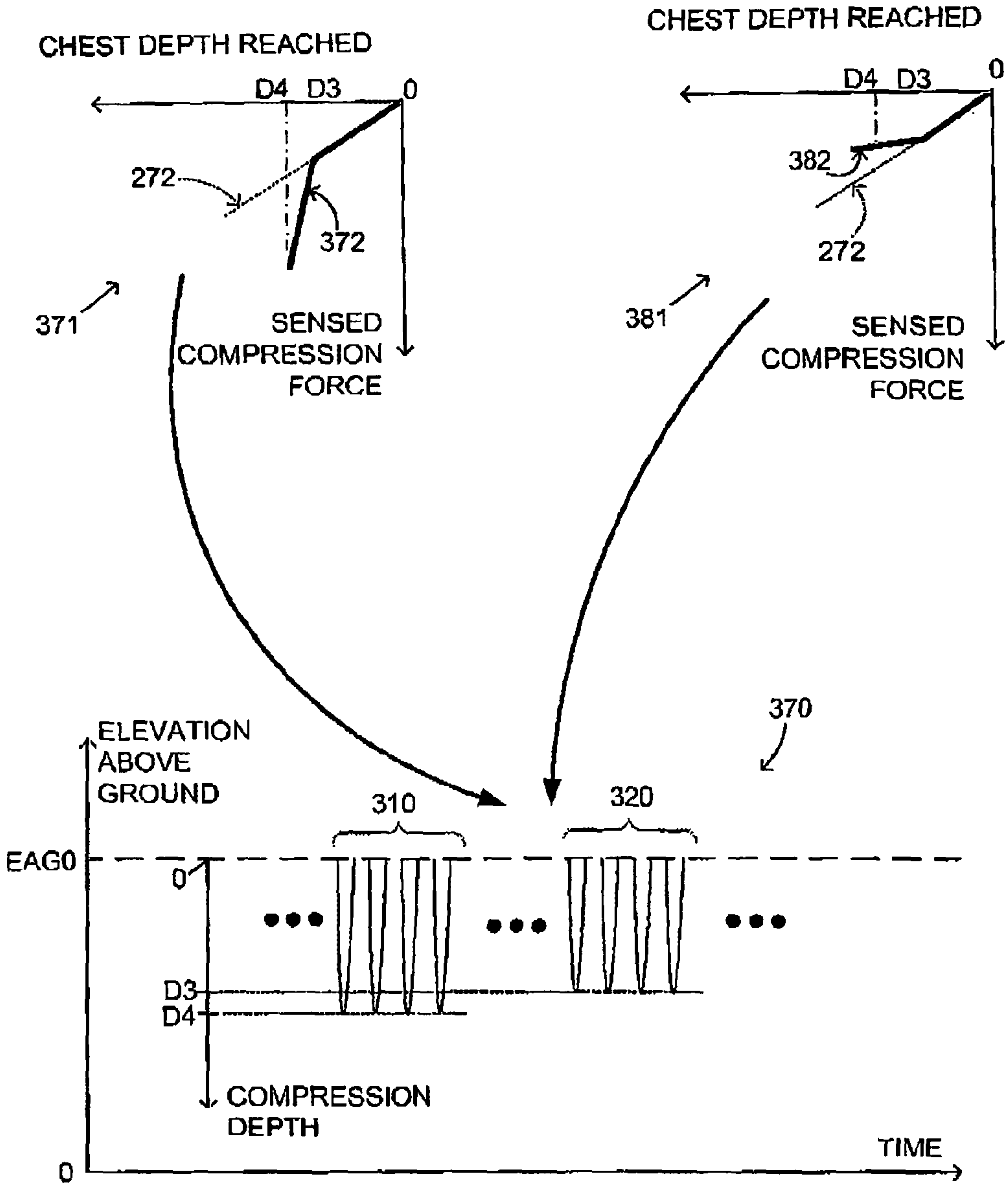
FIG. 3 is a composite diagram showing sample ways in which a motion-time profile may be adjusted according to a detected compression force, according to embodiments.

FIG. 3 is another composite diagram, for illustrating embodiments where compression depth may be adjusted. At the bottom is a diagram 370 with a horizontal time axis, a major vertical axis indicating elevation above ground, and a minor vertical axis 375 indicating compression depth, similarly with diagram 270. The motion-time profile below EAG0 is shown for two groups 310, 320 of compressions. These compressions are shaped substantially as sinusoids, although they could be shaped otherwise such as square waves, triangles, etc.

The compressions of group 310 reach a maximum compression depth D4. Different examples of alert conditions are now described, arising from differences in what was shown in diagram 271.

In FIG. 3, there are also diagrams 371, 381. Their vertical axes measure, in a downward direction, the sensed compression force. Their horizontal axes measure, in a direction to the left, the chest depth reached.

COMPRESSIONS TOO DEEP: As seen in diagram 371, the sensed amount of the compression force is plotted as a line 372 that is different from line 272. In other words, the sensed amount of the compression force is different from what was expected, or from what was previously sensed in the same session. Line 372 may indicate that, past some depth, resistance to compressions increases very much, and the extra compression depth is likely not helpful. As a result of detecting that compressions attempt to go too deeply, the maximum depth for subsequent compressions group 320 has been adjusted to a shallower value D3. An approximate value of D3 is also seen in diagram 371.

RIBS POSSIBLY BREAKING or PATIENT POSSIBLY MIGRATING: As seen in diagram 381, the sensed amount of the compression force is plotted as a line 382 that is different from line 272. In other words, the sensed amount of the compression force is different from what was expected, or from what was previously sensed in the same session. Line 382 may indicate that, past some depth, resistance to compressions increases less per unit of depth reached. This is consistent with ribs unfortunately breaking, in the effort to save the patients life. Or, it could be that the patients body has migrated from the patients sternum to soft abdominal tissue. As a result, subsequent compressions group 320 may have a shallower maximum depth D3.

In some embodiments, if the sensed amount of the compression force meets an alert condition, the motion-time profile is adjusted by discontinuing driving the compression mechanism. For example, when it is detected that the patient could have migrated, operation may thus stop, instead of being adjusted as shown in FIG. 3.

Figure 4:
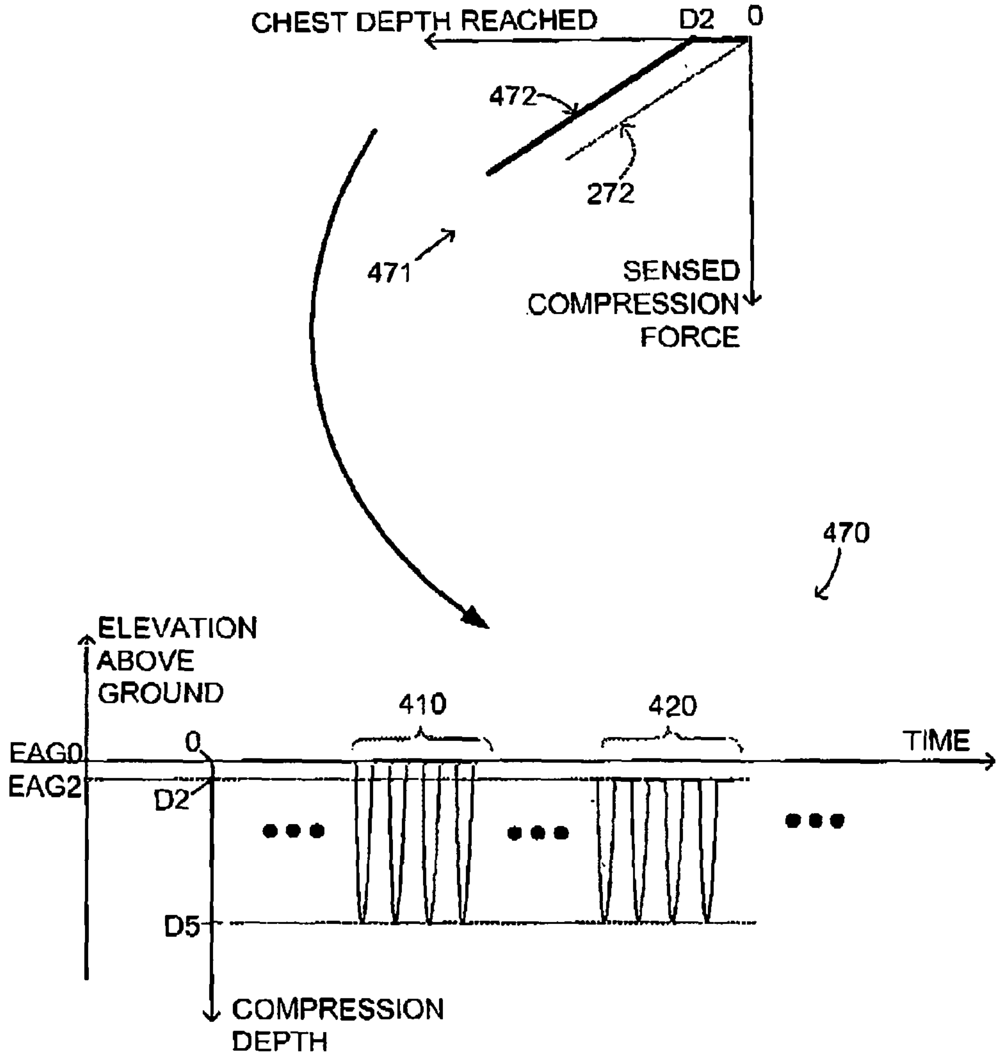
FIG. 4 is a composite diagram showing a sample way in which a motion-time profile may be adjusted according to a detected compression force, according to embodiments.

FIG. 4 is a composite diagram similar to that of FIG. 3, but for illustrating embodiments where an adjustment can be made for diminished chest resting height. FIG. 4 has a diagram 470 measuring the same quantities as diagram 370, and a diagram 471 measuring the same quantities as diagram 371.

CHEST LOSING COMPACTNESS: As seen in diagram 470, the compressions of a group 410 start from the initially determined chest resting height (EAG0), and reach a maximum compression depth D5, measured on minor axis 475. As seen in diagram 471, the sensed amount of the compression force is plotted as a line 472 that is different from line 272. In other words, the sensed amount of the compression force is different from what was expected, or from what was previously sensed in the same session. This could indicate that the resting height has changed, and it is now lower, at depth D2. This change can happen because the chest may lose its compactness, and start breaking down, due to the chest compressions.

The resting height lowering means that the compressions of group 410, which start from the earlier-determined chest resting height EAG0, now impact the chest as their depth crosses the value of D2. In embodiments, the resting height is determined at a first time instant, such as at the beginning of a session with the patient. The resting height may then be determined from an output of the force sensing system at a second time instant, which occurs after a set of the compressions and the releases has been performed after the first time instant. The resting height in the second instant may be updated from what was determined in the first instant. In the example of diagram 471, the updated resting height is thus determined, after compressions group 410, to be at D2. In such embodiments, the motion-time profile can be adjusted in view of the resting height determined at the second time instant. In the example of FIG. 4, the motion-time profile is adjusted by setting the new resting height at D2, or EAG2, and thus resetting the zero point of the CPR machine to a new value.

The updated resting height may be discovered also in different ways. The CPR machine may pause occasionally, and search for it, for example with small oscillations.

In some embodiments, a force value is stored in memory 130. The force value may encode the sensed amount of the compression force, especially if an alert condition has been met. The force value can be of one point, or many, such as in creating line 272. In some embodiments, communication module 190 is configured to communicate the force value.

All of the above describes only a compression portion of an operation of a CPR machine according to embodiments. All of the above may be taking place with or without lifting the chest, for example as described below.

In some embodiments, a CPR machine additionally includes a chest-lifting device. Such a chest-lifting device can be configured to lift the chest, preferably faster than the chest would be lifted unassisted, during its decompression. Sample embodiments of a chest-lifting device are a suction cup, one or more tethers, one or more inflatable bladders, a component with an adhesive material, a combination of such devices, and so on. In the example of FIG. 1, a generic chest-lifting device 152 is shown. In some of these embodiments, lifting is performed by operating in reverse the compression mechanism, such as raising a piston.

In such embodiments, the driver system may be further configured to drive the chest-lifting device according to the motion-time profile so as to cause the chest-lifting device to lift the chest. Lifting can be performed at least while none of the compressions is being performed. In embodiments, the chest is thus lifted during one or more of the releases. Lifting will be understood with respect to a suitable vertical level while the patient is retained within the CPR machine, such as the reference elevation level or other level.

Lifting can be by any amount from where the chest is at the time. For example, lifting may take place because the lifting mechanism thus lifts the chest faster than how fast the chest would naturally decompress without assistance. In addition, the chest-lifting device may lift the chest above the resting height, by 0.5 cm, or more.

In such embodiments, the force sensing system is further configured to sense an amount of a lifting force that is exerted by the chest-lifting device, while the chest-lifting device is thus lifting the chest. At least what was written above for the force sensing system sensing the compression force may be implemented also for sensing the amount of the lifting force.

In embodiments that include such a chest-lifting device, the motion-time profile may be adjusted in view of the sensed amount of the lifting force, instead of the sensed amount of the compression force. Or, the motion-time profile may be adjusted in view of the sensed amount of the lifting force in addition to the sensed amount of the compression force.

In some embodiments, the chest-lifting device is coupled to the compression mechanism. In such embodiments, the sensed amount of the lifting force is an amount of force exerted by the driver system.

It will be recognized that diagram 471 is inadequate for showing lifting to heights above the resting height, and also for showing corresponding forces at such heights. A more complex diagram is now employed for this purpose.

Figure 5:
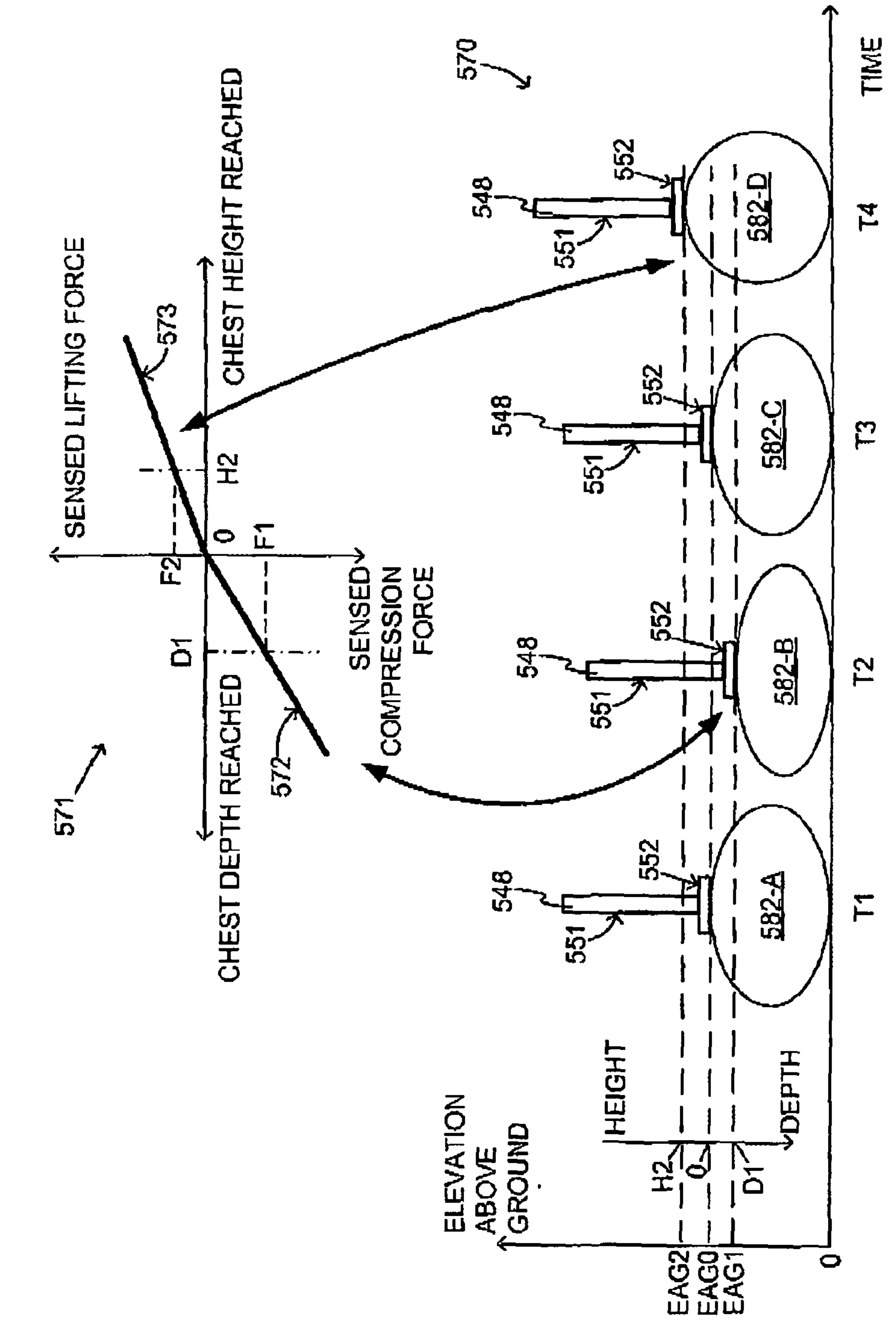
FIG. 5 is a diagram showing sample positions of a compression mechanism and a chest-lifting suction cup of a CPR machine made according to embodiments.

FIG. 5 is a composite diagram similar to that of FIG. 2, for the purpose of discussing embodiments where the chest is compressed and actively decompressed. FIG. 5, diagram 571 has axes that are similar to those of diagrams 271,371, 471, but they extend beyond the origin. In particular, the vertical axis indicates, in the upward direction the sensed lifting force. Moreover, the horizontal axis indicates, in the right direction, the chest height reached above the chest resting height.

FIG. 5, diagram 570 shows has a major vertical axis indicating the elevation above ground, and a major time axis. In addition, it has a minor vertical axis 575 indicating depth of chest compression, and height of active decompression. In diagram 570 cross-sections 582-A, 582-B, 582-C,582-D of a torso are shown at times T1,T2,T3,T4, respectively. A sample compression mechanism 548 includes a piston 551, although the compression mechanism may be implemented differently. In the example of diagram 570, compression mechanism 548 also includes a chest-lifting suction cup 552, which is adhered to the bottom of piston 551 and to the chest of the patient.

At time T1, piston 551 merely contacts torso cross-section 582-A at the top, without a compression being performed. The bottom of piston 551 is at elevation level EAG0. The chest resting height is thus at EAG0. Similarly, at time T3, piston. 551 contacts torso cross-section 582-C at the top, without a compression being performed.

At time T2, compression mechanism 548 is performing a compression, which means that piston 551 compresses torso cross-section 582-B. The chest now is compressed, and has an elevation level EAG1 that is lower than EAG0. On the minor height axis, this corresponds to depth D1.

At time T4, chest-lifting suction cup 552 is lifting the chest, which is as shown in torso cross-section 582-D. The chest is at an elevation level EAG2 that is higher than EAG0, i.e. higher than the resting height. On the minor height axis, this corresponds to height H2.

In embodiments where the compression mechanism is caused to repeatedly perform the compressions and the releases, the torso cross-sections could be rotating among the positions shown at times T1, T2, T3, T4. In these cases, however, there could be forces exerted also during times T1 and T3. In particular, at time T3 the lifting of the chest could be faster than the speed with which the chest would be naturally increasing in height, if it were decompressing without assistance from its compressed state of time T2. And at time T1 the compression could be faster than the speed with which the chest would be naturally losing height from the lifted state of time T4, if it were recovering without assistance.

In diagram 571, line 572 could be the same as line 272. It should be remembered that the upward lifting force could be measured for height values that are below the chest resting height.

As mentioned above, operation of the CPR machine may cause the torso cross-sections to rotate through the states shown at times T1, T2, T3, T4. Seen in diagram 571, the measured compression and lifting forces may trace back and forth the composite line made from lines 572, 573. Or one or both of lines 572, 573 could be part of a lobe that is being traced, which is different for the phase of downward motion than the upward motion.

In such embodiments, the motion-time profile may be adjusted in view of the sensed amount of the lifting force, or the compression force, if there is a surprise or irregularity. The sensed amount of the lifting force may communicate information about the current state of the patient that is thus taken into account.

This adjustment of the motion-time profile may be performed in a number of ways. Examples are now described where the motion-time profile includes a maximum height above the reference elevation level, to which the chest is lifted. In such embodiments the motion-time profile can be adjusted by adjusting the maximum height, but other parameters can also change.

In some instances, the maximum height may be determined by lifting the chest until the sensed amount of the lifting force meets a lifting force threshold. The lifting force threshold can be determined from the sensed amount of the compression force, or another way.

Figure 6:
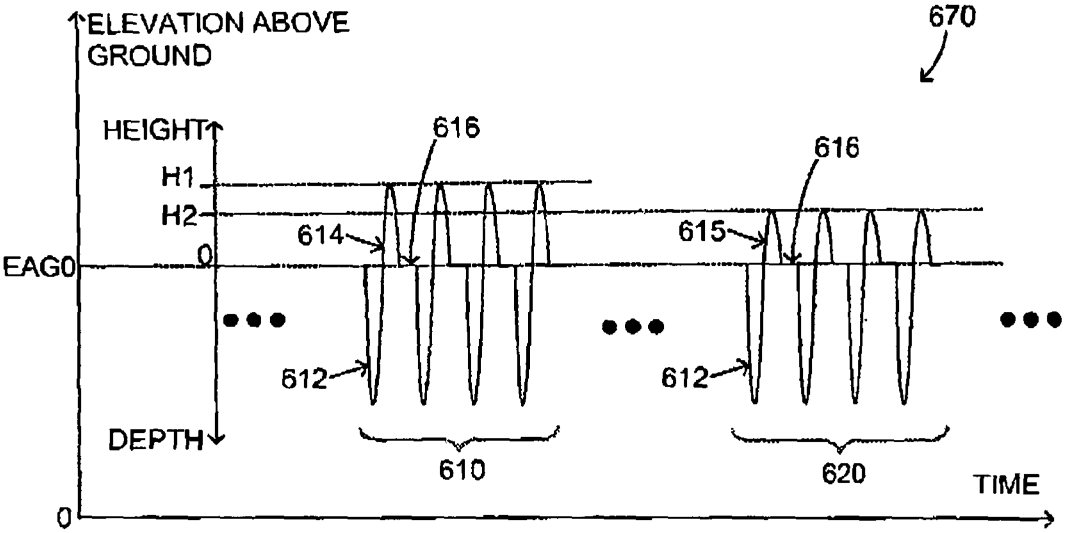
FIG. 6 is a time diagram showing a sample way in which a motion-time profile may be adjusted according to a detected lifting force, according to embodiments.

FIG. 6 is a diagram 670 similar to diagram 370 of FIG. 3, for illustrating embodiments where the maximum height of decompression can be adjusted. Two groups 610, 620 of cycles are shown. In each cycle of group 610 there is a compression 612 followed by a release, a lifting 614 above EAG0 followed by a release, and an optional pause 616, that helps determine the duty cycle. The compressions 612 with their releases below EAG0 are shaped substantially as sinusoids in this example.

Liftings 614 in group 610 reach a maximum height HI, seen in minor vertical axis 675. Different examples of alert conditions are now described, arising from differences in what was shown in diagram 571.

REACHING THE “CEILING”: The sensed amount of the lifting force may indicate that, past some height, resistance to lifting increases very much. This threshold height can be called the “ceiling.” As a result of detecting that too-high a lifting is attempted, the maximum height reached by the liftings of subsequent group 620 has been adjusted to a lower value, for example H2.

In some embodiments, the motion-lime profile is adjusted by discontinuing driving the lifting mechanism, if the sensed amount of the lifting force meets a stop condition. An example is now described.

Figure 7:
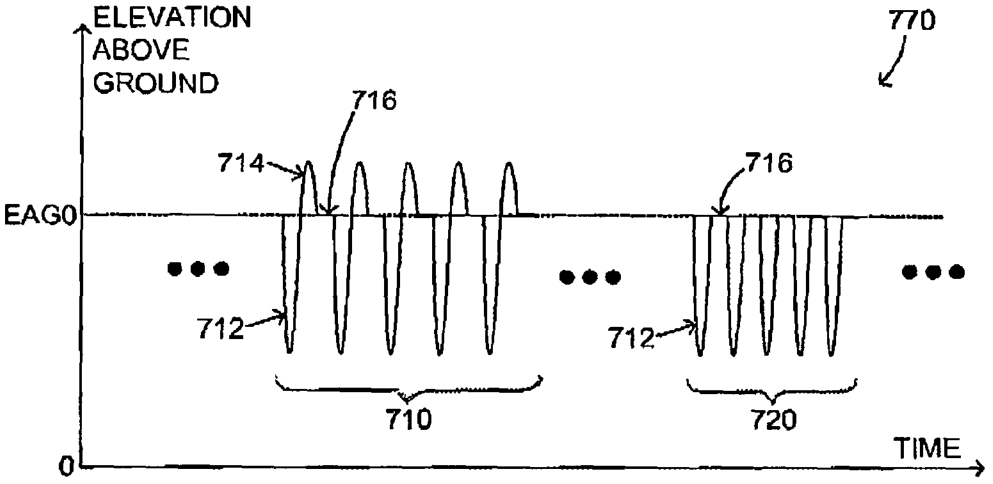
FIG. 7 is a time diagram showing a sample way in which a motion-time profile may be affected according to detected force, according to embodiments.

CHEST-LIFTING DEVICE DETACHED: FIG. 7 is a diagram 770 that is similar to diagram 670 of FIG. 6, but instead for illustrating embodiments where there may be detachment. Two groups 710, 720 of cycles are shown. In each cycle of group 710 there is a compression 712 followed by a release, a lifting 714 above EAG0 followed by a release, and an optional pause 716. The compressions 712 with their releases below EAG0 are shaped substantially as sinusoids in this example. The sensed amount of the lifting force may indicate that the chest-lifting device has become detached. For instance, the sensed amount of the lifting force attributable to active decompression could be 0 for times between T2 and T4 of FIG. 5. As a result of detecting the detachment, the liftings are not continued. In subsequent group 720, each cycle includes only a compression 712 followed by a release, and the optional pause 716.

PATIENT’s WHOLE BODY BEING LIFTED: The sensed amount of the lifting force may indicate that the patient is being lifted. For example, if the lifting force remains constant while there is still upward displacement, it may indicate that the patient is being lifted off of the backboard (perhaps because the patient is lightweight) rather than the patient’s chest being expanded.

Adjustments of the motion-time profile may involve the frequency of the chest compressions. For example, with a “slow” waveform, the heart may be filled with more blood, perhaps requiring a larger compression force and a smaller lifting force than when the heart is less filled with blood. Conversely, a fast waveform may serve to “empty” the heart, in which it may be more effective to have a smaller compression force but a larger lifting force.

In some embodiments, the choice of how to respond is programmed in the CPR machine. In some embodiments, the choice can be made by a user, for example via a User Interface. The user can be a medical director in setting the parameters of the machine, or a rescuer in the field. Additional measures may be taken. For example, in some embodiments, a user interface is configured to emit an alert, if the sensed amount of the lifting force meets an alert condition. Upon perceiving the alert, a rescuer may pause the CPR machine and make adjustments. Adjustments may include, in addition, changing the timing of ventilation that might be affecting intra-thoracic pressure.

Figure 8:
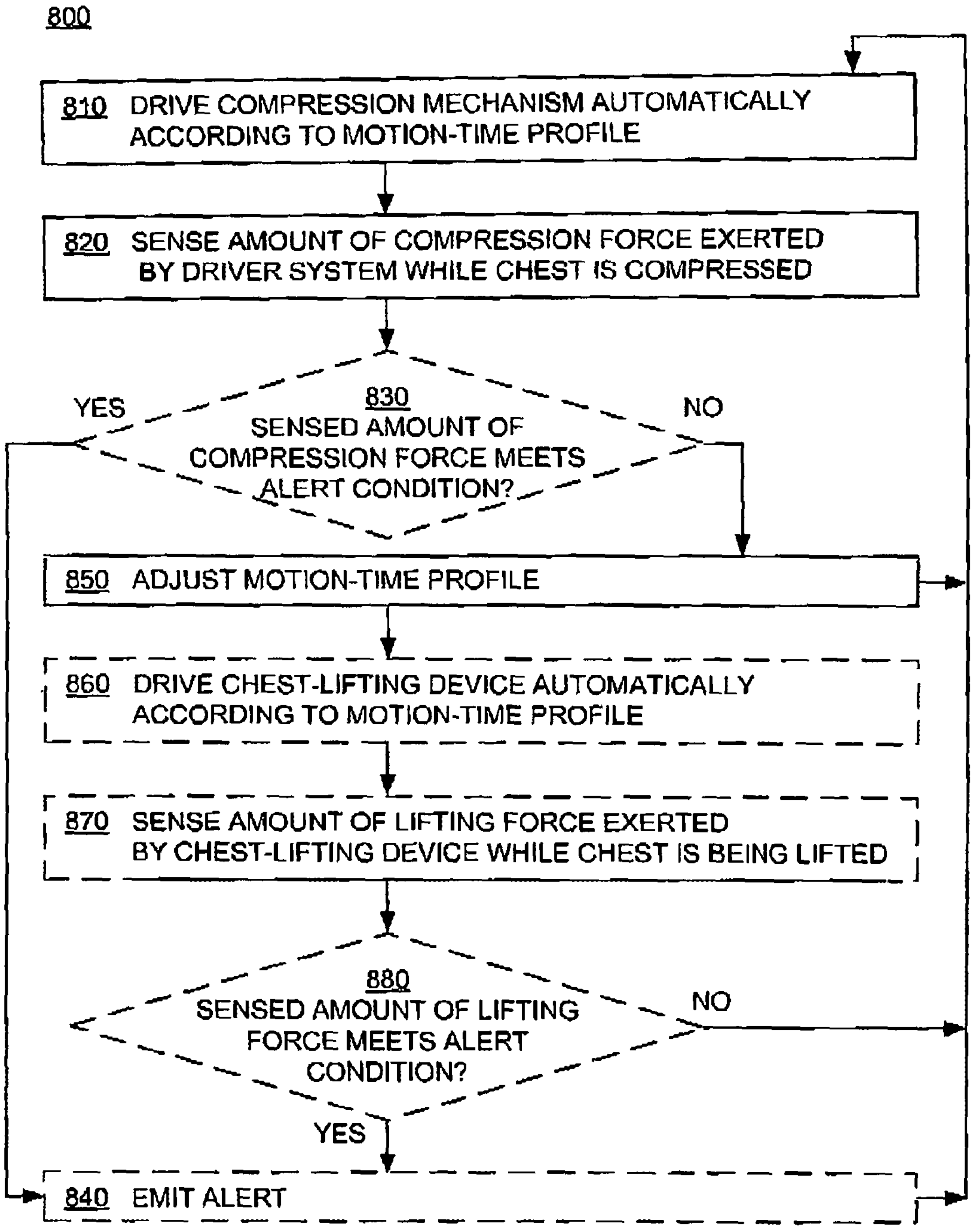
FIG. 8 is a flowchart for illustrating methods according to embodiments.

FIG. 8 shows a flowchart 800 for describing methods according to embodiments. The methods of flowchart 800 may also be practiced by embodiments described elsewhere in this document, such as CPR machines, storage media, etc. In addition, the operations of flowchart 800 may be enriched by the variations and details described elsewhere in this document.

According to an operation 810, a compression mechanism is driven automatically according to a motion-time profile. Driving can be performed by a driver system, and may cause the compression mechanism to repeatedly perform compressions and releases. At least two of the compressions may thus compress a patient’s chest by at least 2 cm downward from its resting height.

According to another operation 820, an amount of a compression force exerted by the driver system may be sensed. Such sensing may take place when the chest is compressed downward, by any amount of travel from the resting height, such as 1 cm, longer, etc.

According to another, optional operation 830, it is determined whether the sensed amount of the compression force meets an alert condition. If so, then according to another, optional operation 840, an alert is emitted via the user interface.

Even if, at operation 830, it is not determined that the alert condition has been met, then according to another operation 850, the motion-time profile can be adjusted, for example if there is a surprise as mentioned above. Adjustment can be performed in a number of such as in view of the sensed amount of the compression force, or a sensed amount of a lifting force as sensed in the later described operation 870, both such forces, etc.

In some embodiments, after operation 850, execution returns to operation 810. Additional operations are possible in embodiments where the CPR machine further includes a chest-lifting device. For example, according to another, optional operation 860, the chest-lifting device can be driven according to the motion-time profile. Such driving can be by the driver system, and can cause the chest-lifting device to lift the chest, especially while none of the compressions is being performed.

According to another, optional operation 870, an amount of a lifting force can be sensed, which is exerted by the chest-lifting device while the chest-lifting device is thus lifting the chest. Such sensing may be performed by the force sensing system.

According to another, optional operation 880, it is determined whether the sensed amount of the lifting force meets an alert condition. If not, then execution may return to operation 810. If yes, then an alert can be emitted, for example according to operation 840.

In some embodiments, a chest-lifting device is included and the driver system is configured to drive the compression mechanism automatically according to a motion-time profile, so as to cause the compression mechanism to perform repeatedly the compressions and the releases. The driver system may be further configured to concurrently drive the chest-lifting device according to the motion-time profile, so as to cause the chest-lifting device to lift the chest, especially while none of the compressions is being performed. In some embodiments, the chest is thus lifted during at least one of the releases. In fact, the chest-lifting device may be coupled to the compression mechanism. In some embodiments, the driver system is further configured to drive the chest-lifting device so as to cause the chest to be lifted above the resting height, by 0.5 cm or another distance.

In addition, the CPR machine may include a failure detector, which can be configured to detect if the chest-lifting device fails to thus lift the chest. Such a failure detector may be implemented in a number of ways. For example, the failure detector may include a force sensing system, such as described above. Other examples are now described.

Figure 9:
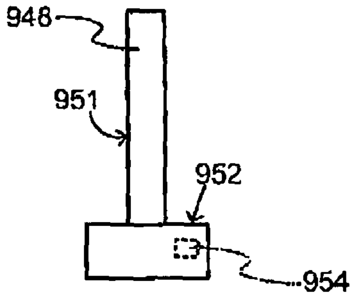
FIG. 9 is a diagram of a sample compression mechanism of a CPR machine made according to an embodiment, with an optional failure detector.

FIG. 9 is a diagram of a sample compression mechanism 948. Compression mechanism 948 is part of a CPR machine (not shown), and includes a piston 951 and a suction cup 952. Compression mechanism 948 also includes a failure detector 954.

Failure detector 954 may be a light sensor or photodetector, which thus senses either the ambient light (detachment), or less than that (attachment). In some embodiments, an LED is also provided so as to generate the light that is to be sensed.

Alternately, failure detector 954 may be an air pressure sensor, which thus senses either the atmospheric pressure (detachment), or less than that (attachment). If the lifting force does not exceed a threshold, it may be an indication that there is air in the suction cup, even though detachment may not have occurred, in which case the rescuer could be alerted. The rescuer might even apply adhesive between the suction cup and the chest, to improve adherence of the suction cup during active decompression. The adhesive can be adhesive material, a hydrocolloid dressing such as Duoderm® a double-sided adhesive tape or sticker, a pad that has adhesive on both sides, Velcro, etc. The adhesive may prevent migration, i.e., movement or "walking" of the piston down the patient's chest toward the patient's abdomen during the operation of the CPR machine.

Figure 10:
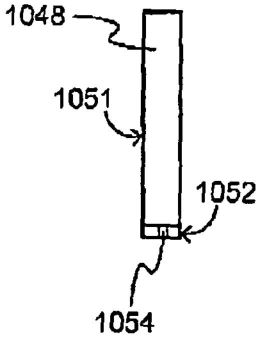
FIG. 10 is a diagram of a sample compression mechanism of a CPR machine made according to an embodiment, with an optional failure detector.

FIG. 10 is a diagram of a sample compression mechanism 1048. Compression mechanism 1048 is part of a CPR machine (not shown), and includes a piston 1051 and a pad 1052 with adhesive material. Compression mechanism 1048 also includes a failure detector 1054. Failure detector 1054 may be a contact pressure sensor, a capacitance meter, or a proximity detector, configured similarly to the examples described above.

In embodiments that include a failure detector, as the driver system drives according to a motion-time profile, this motion-time profile may be adjusted, responsive to the failure detector detecting that the chest-lifting device fails to thus lift the chest. There is a number of ways of making this adjustment. For example, the motion-time profile may include a maximum height above the reference elevation level at which the chest-lifting device lifts the chest, and the motion-time profile can be adjusted by adjusting the maximum height, or by stopping driving the chest-lifting device, for example as seen in FIG. 7.

Figure 11:
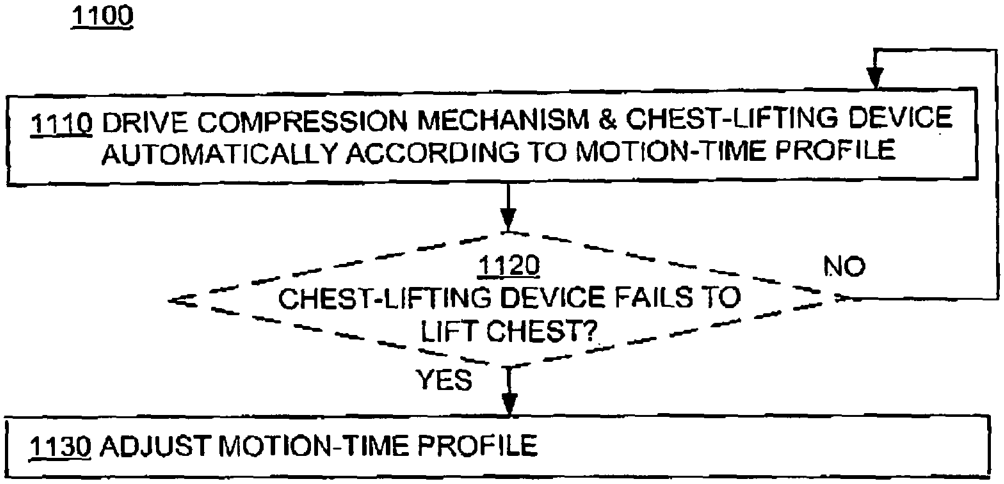
FIG. 11 is a flowchart for illustrating methods according to embodiments.

FIG. 11 shows a flowchart 1100 for describing methods according to embodiments. The methods of flowchart 1100 may also be practiced by embodiments described elsewhere in this document, such as CPR machines, storage media, etc. In addition, the operations of flowchart 1100 may be enriched by the variations and details described elsewhere in this document.

According to an operation 1110, a compression mechanism is driven automatically according to a motion-time profile, and a chest-lifting device is concurrently driven according to the motion-time profile. Driving can be performed by a driver system, and may cause the compression mechanism to repeatedly perform compressions and releases. At least two of the compressions may thus compress a patient's chest by at least 2 cm downward from its resting height. Driving may further cause the chest-lifting device to lift the chest while none of the compressions is being performed.

According to another, optional operation 1120, it is detected whether the chest-lifting device subsequently fails to thus lift the chest. Detecting may be performed by the failure detector. If not, then execution may return to operation 1110.

If yes, then according to another operation 1130, the motion-time profile may be adjusted. Adjustment can be responsive to detecting that the chest-lifting device fails to thus lift the chest, for example as seen above.

In embodiments of CPR machines that include a failure detector, the CPR machine may further include an electronic component, examples of which were seen in FIG. 1. The electronic component can be configured to take an action responsive to the failure detector detecting that the chest-lifting device fails to thus lift the chest. Examples are now described.

The electronic component can be user interface 114. The action can be that user interface 114 emits an alert.

The electronic component can be memory 130. The action can be that a record is stored in memory 130 of an event that the chest is not lifted by at least 0.5 cm above the resting height.

The electronic component can be communication module 190. The action can be that communication module 190 transmits a message about the chest not being lifted by at least 0.5 cm above the resting height.

Figure 12:
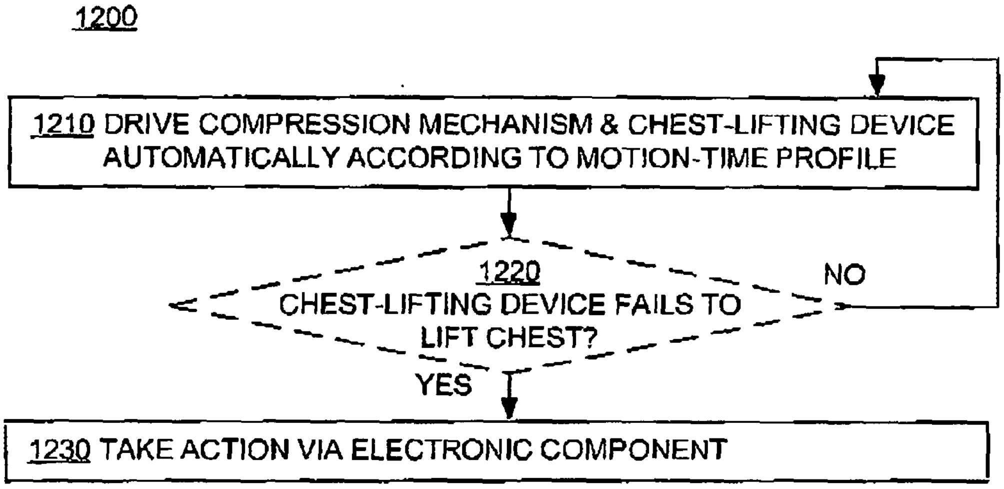
FIG. 12 is a flowchart for illustrating methods according to embodiments.

FIG. 12 shows a flowchart 1200 for describing methods according to embodiments. The methods of flowchart 1200 may also be practiced by embodiments described elsewhere in this document, such as CPR machines, storage media, etc. In addition, the operations of flowchart 1200 may be enriched by the variations and details described elsewhere in this document.

According to an operation 1210, a compression mechanism is driven automatically according to a motion-time profile, and a chest-lifting device is driven concurrently according to the motion-time profile. Driving can be performed by a driver system, and may cause the compression mechanism to repeatedly perform compressions and releases. At least two of the compressions may thus compress a patient's chest by at least 2 cm downward from its resting height. Driving may further cause the chest-lifting device to lift the chest while none of the compressions is being performed.

According to another, optional operation 1220, it is detected whether the chest-lifting device subsequently fails to thus lift the chest. Detecting may be performed by the failure detector. If not, then execution may return to operation 1210.

If yes, then according to another operation 1230, an action may be taken via an electronic component. The action may be taken responsive to detecting that the chest-lifting device fails to thus lift the chest. Examples of such components and corresponding actions are given above.

In some embodiments, the CPR machine has a retention structure and a tether coupled to the retention structure. The tether may lift the chest when the compressions are not being performed. Examples are now described.

Figure 13A:
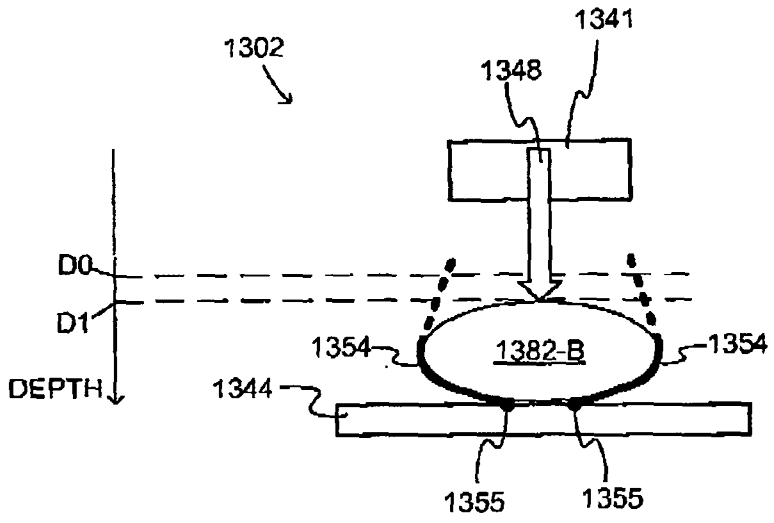
FIG. 13A is a diagram of sample components of a CPR machine that includes a tether according to embodiments, and which is performing a compression on a patient.

FIG. 13A is a diagram 1302 of only some of the components of a sample CPR machine according to embodiments. The CPR machine may include a retention structure, in which the patient may be placed supine. Of the retention structure, only a backboard 1344 is shown for simplicity. While backboard 1344 is shown as flat, sometimes it may be curved so that its ends may be slightly higher than the middle portion.

The components additionally include a compression mechanism 1348 coupled to the retention structure. Compression mechanism 1348 is shown generically, and it could be a piston, a squeezing belt, and so on. In diagram 1302, a compression is being performed on the patient, for example as in moment T2 of FIG. 5. In diagram 1302, the torso cross-section is 1382-B. As seen from a vertical depth axis 1375, the chest is being compressed from the resting height DO to a depth D1.

The components further include a chest-lifting tether, which is also sometimes called simply a tether. In the example of FIG. 13A, the chest-lifting tether is provided in two tether segments 1354. The chest-lifting tether may be coupled to the retention structure. In the example of FIG. 13A, chest-lifting tether segments 1354 are coupled to backboard 1344 at respective junctions 1355.

The tether is configured to lift the chest, as will be explained below. In some embodiments, a substantially rigid member is attached to the tether, to assist with the lifting. The remainder of how tether segments 1354 are coupled to the retention structure is not shown because diagram 1302 is only generic.

The components moreover include a driver system 1341. Driver system 1341 can be configured to drive compression mechanism 1348 automatically, so as to cause the compression mechanism to repeatedly perform compressions and releases, as has been described above. Driver system 1341 can be further configured to drive the chest-lifting tether concurrently with driving compression mechanism 1348. Driving the chest-lifting tether can be such as to cause the chest-lifting tether to lift the chest. This lifting may take place while none of the compressions is being performed, as seen immediately below.

Figure 13B:
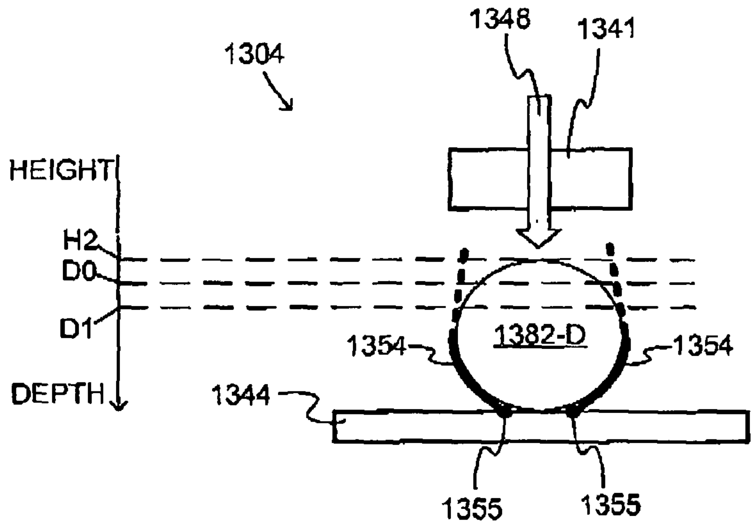
FIG. 13B is a diagram of the components of FIG. 13A, where the tether is lifting the patient's chest according to embodiments.

FIG. 13B is a diagram 1304 of the components of FIG. 13A. Diagram 1304 is at a time when none of the compressions of FIG. 13A is being performed, for example as in moment T4 of FIG. 5. In fact, the chest is thus lifted during one of the releases of compression mechanism 1348. In diagram 1304, the torso cross-section is 1382-D. As seen from a vertical depth axis 1375, the chest is being lifted to a height H2, which is above the resting height DO.

FIG. 13B is an example of embodiments where the chest-lifting tether lifts the chest by substantially biasing a side of the patient. It is also an example of embodiments where driver system 1341 is configured to drive the chest-lifting tether so as to cause the chest to be lifted above resting height DO. Indeed, height H2 could be at least 0.5 cm above DO.

The chest-lifting tether may lift the chest in a number of ways. Two examples are now described that correspond to FIG. 13B.

Figure 14:
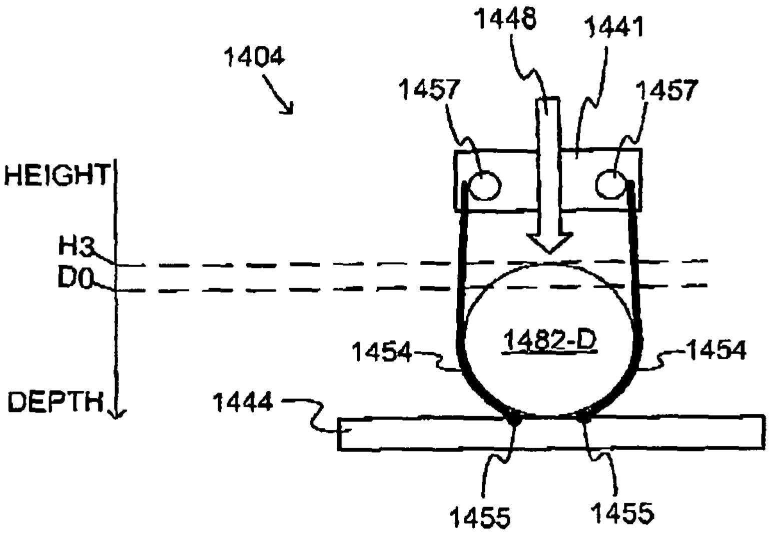
FIG. 14 is a diagram showing how the machine of FIG. 13A may be implemented with a pulley according to an embodiment.

FIG. 14 is a diagram 1404 showing how the embodiments of FIG. 13A may be further implemented with a pulley. More particularly, FIG. 14 is a diagram 1404 of only some of the components of a sample CPR machine according to an embodiment. The CPR machine may include a retention structure, of which only a backboard 1444 is shown for simplicity. The components additionally include a compression mechanism 1448 and a driver system 1441, which may operate similarly with what was written for compression mechanism 1348 and driver system 1341.

The components further include a chest-lifting tether, which is provided in two tether segments 1454. Tether segments 1454 are coupled to backboard 1444 at respective junctions 1455.

The components additionally include at least one pulley that is configured to roll. In diagram 1404 two pulleys 1457 are shown. The chest-lifting tether is partially wrapped around pulleys 1457.

Driving the chest-lifting tether, which may be performed by driver system 1441, includes rolling pulleys 1457, which lifts the chest. In diagram 1404, the torso cross-section is 1482-D. As seen from a vertical depth axis 1475, the chest is thus lifted to a height H3, which is above the resting height DO. During compressions, pulleys 1457 are rolled in the opposite direction, which releases tether segments 1454 and permits the patient to be lowered.

Figure 15:
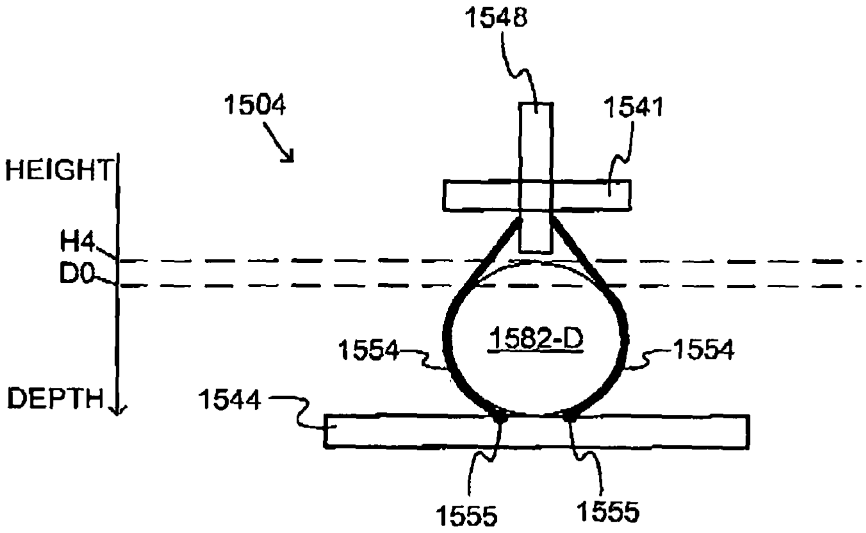
FIG. 15 is a diagram showing how the machine of FIG. 13A may be implemented by coupling the tether to a piston according to an embodiment.

FIG. 15 is a diagram 1504 showing how the embodiments of FIG. 13A may be further implemented. More particularly, FIG. 15 is a diagram 1504 of only some of the components of a sample CPR machine according to an embodiment. The CPR machine may include a retention structure, of which only a backboard 1544 is shown. The components additionally include a compression mechanism 1548, which is a piston 1548 that can perform compressions. It will be understood that the piston may have a termination at the bottom that is suitable for contacting the patients chest during the compressions, but such is not shown for simplicity. The components moreover include a driver system 1541, which can drive piston 1548 similarly with what was written for compressions.

The components further include a chest-lifting tether, which is provided in two tether segments 1554. Tether segments 1554 are coupled to backboard 1544 at respective junctions 1555. In FIG. 15, the chest-lifting tether is coupled to compression mechanism 1548.

Driving the chest-lifting tether, which may be performed by driver system 1541, includes driving compression mechanism 1548 upwards with enough lifting force to lift tether segments 1554. In other words, piston 1548 is driven in reverse. When lifted this way, tether segments 1554 in turn lift the patient during the releases of compression mechanism 1548. In diagram 1504, the torso cross-section is 1582-D. As seen from a vertical depth axis 1575, the chest is thus lifted to a height H4, which is above the resting height DO. During compressions, tether segments 1554 are automatically lowered.

In the above embodiments, during compressions the tether may be slack, or not. Having the tether not be slack may advantageously increase the intra-thoracic pressure.

In some embodiments, the CPR machine has a retention structure, a chest-lifting inflatable bladder coupled to the retention structure, and a fluid pump configured to inflate the bladder. Inflating the bladder may lift the chest when the compressions are not being performed. Examples are now described.

Figure 16A:
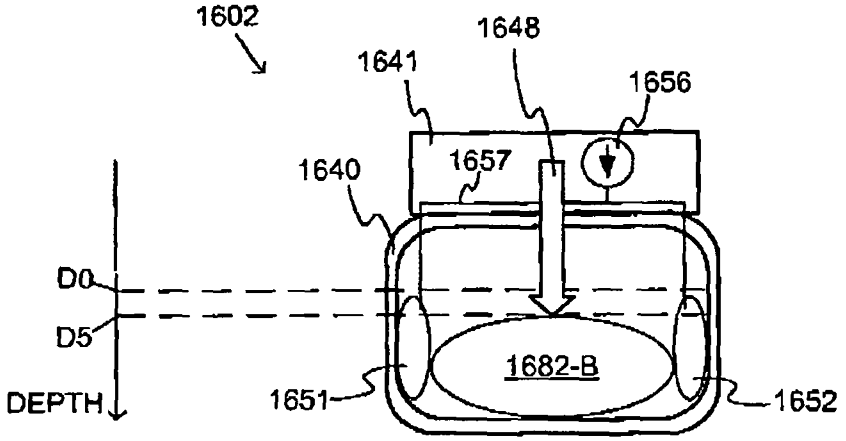
FIG. 16A is a diagram of sample components of a sample CPR machine that includes an inflatable bladder according to an embodiment, and which is performing a compression on a patient.

FIG. 16A is a diagram 1602 of only some of the components of a sample CPR machine according to embodiments. The CPR machine may include a retention structure 1640, in which the patient may be placed supine.

The components additionally include a compression mechanism 1648 coupled to retention structure 1640. Compression mechanism 1648 is shown generically, and it could be a piston, a squeezing belt, and so on. In diagram 1602, a compression is being performed on the patient, for example as in moment T2 of FIG. 5. In diagram 1602, the torso cross-section is 1682-B. As seen from a vertical depth axis 1675, the chest is being compressed from the resting height DO to a depth D5.

The components of FIG. 16A further include at least one chest-lifting bladder, which is coupled to retention structure 1640. In the example of diagram 1602 two chest-lifting bladders 1651, 1652 are provided. In the example of FIG. 16A, chest-lifting bladders 1651, 1652 are coupled to retention structure 1640 so that they contact the sides of patient's 1682-B torso.

The components additionally include a fluid pump 1656. Fluid pump 1656 can be configured to inflate bladders 1651, 1652 via a system of pipes 1657. It is understood that, for lifting the patient's chest, bladders 1651, 1652 will be caused to be alternatingly inflated and deflated. Inflating can be with a fluid such as a liquid, air, or other gas from fluid pump 1656. If using a liquid, a reservoir may be further provided to store the fluid during the deflations.

The components of FIG. 16A moreover include a driver system 1641. Driver system 1641 can be configured to drive compression mechanism 1648 automatically, so as to cause the compression mechanism to repeatedly perform compressions and releases, as has been described above. Driver system 1641 can be further configured to operate the fluid pump concurrently with driving compression mechanism 1648. Operating fluid pump 1656 can be such as to cause fluid pump 1656 to inflate chest-lifting bladders 1651, 1652 so as to cause chest-lifting bladders 1651, 1652 to lift the chest. In this example, bladder 1652 is configured to operate substantially in unison with chest-lifting bladder 1651. This lifting may take place while none of the compressions is being performed, as seen immediately below.

Figure 16B:
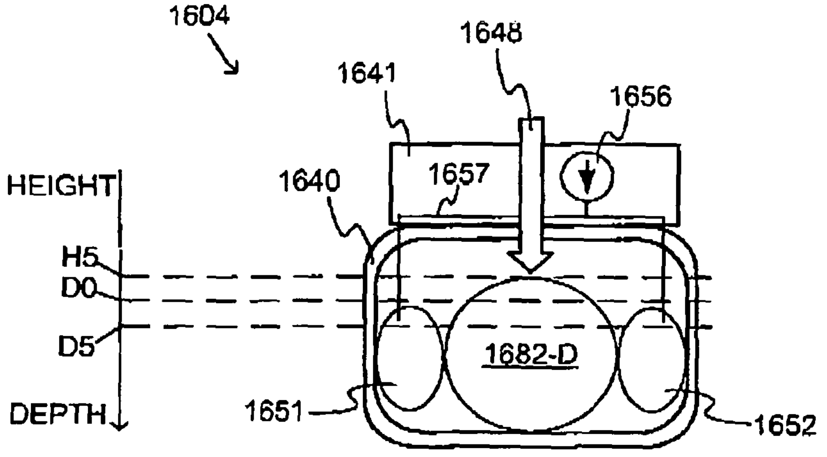
FIG. 16B is a diagram of the components of FIG. 16A, where the inflatable bladders is lifting the patient's chest according to embodiments.

FIG. 16B is a diagram 1604 of the components of FIG. 16A. FIG. 16B is at a time when none of the compressions of FIG. 16A is being performed, for example as in moment T4 of FIG. 5. In fact, the chest is thus lifted during one of the releases of compression mechanism 1648. In diagram 1604, the torso cross-section is 1682-D. As seen from vertical depth axis 1675, the chest is being lifted to a height H5, which is above the resting height DO. The chest is being thus lifted because chest-lifting bladders 1651, 1652 have been inflated via fluid pump 1656, and are biasing the torso from the side.

FIG. 16B is an example of embodiments where chest-lifting bladders 1651, 1652 lift the chest by substantially biasing a side of the patient. It is also an example of embodiments where driver system 1641 is configured to drive chest-lifting bladders 1651, 1652 so as to cause the chest to be lifted above resting height DO. Indeed, height H5 could be at least 0.5 cm above DO.

The chest may be lifted also in other ways, for example using a magnetic or ferrous metal tape or sticker adhesively applied to the chest of the patient, or a combination of both adhesive and magnetic materials. In magnetic embodiments, the suction cup could include a magnet that would attract the tape to improve the adherence of the suction cup during the liftings. In other embodiments, the piston would include an electromagnet to provide the attractive force to the tape.

A tape adhered to the patient's chest could have additional uses. For example, the tape may include a graphical indication for placement or positioning of the suction cup on the patient's chest. For instance, the graphical indication could be drawn as a target, include a circle slightly larger than the perimeter of the suction cup, have colors and other drawings, etc. The rescuer can apply the tape so that the target was properly positioned on the chest, and then position the patient within the retention structure so that the suction cup attaches to the patient according to the target.

In enhancements, the tape or sticker includes a defibrillation electrode pad, with the other defibrillation pad being arranged and configured on the back plate or in a lateral stabilization structure on the back plate.

In embodiments, the chest may be lifted between every pair of compressions, or not. In some embodiments, the chest might be lifted substantially fewer times than it is compressed. An example is now described.

Figure 17:
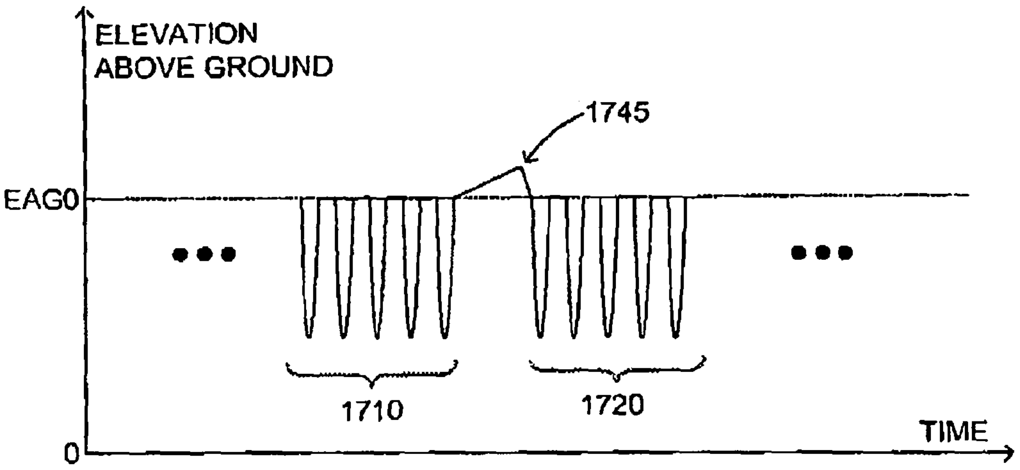
FIG. 17 is a time diagram illustrating that the chest might be lifted only occasionally between compressions, according to embodiments.

FIG. 17 is a time diagram plotting elevation above ground over time, and shows the time evolution of two sets 1710, 1720 of compressions. The chest is not lifted above the resting height EAG0, except for only one lifting 1745 between sets 1710, 1720. Lifting 1745 may correspond to occasional breaths that a rescuer is expected to deliver to a patient between sets of compressions. FIG. 17 is thus an example of where the chest is lifted only once while four successive compressions are performed, two from set 1710 and two from set 1720. Lifting 1745 may be to a height above the resting height.

The example of FIG. 17 may be implemented in a number of embodiments. For instance, a driver system can be configured to drive the compression mechanism and to drive the chest-lifting device so as to cause the chest to be lifted only occasionally. For example, lifting might be only once while four or more successive compressions are performed, even though the driver system could lift the chest between compressions without needing to perform the compressions more slowly. The chest-lifting device may be a tether, suction cup, or otherwise.

The example of FIG. 17 may be implemented well where the lifting mechanism needs more time to lift effectively than is provided within the space of two successive compressions. For instance, driver system 1648 can be configured to drive compression mechanism 1648 and to operate fluid pump 1656 so as to cause the chest to be lifted only once while four or more successive compressions are performed. In other words, the motion-time profile need not generate liftings for every release from every compression.

In some embodiments, CPR machines lift the chest to the same height substantially. every time. In other embodiments, however, they lift the chest to different heights. In the following examples, a CPR machine may have a compression mechanism, a chest-lifting device, and a driver system. The driver system can be configured to drive the compression mechanism automatically according to a motion-time profile as also described previously. The driver system can be further configured to concurrently drive the chest-lifting device according to the motion-time profile.

Driving the compression mechanism and the chest-lifting device according to the motion-time profile can cause the chest-lifting device to lift the chest to different heights. In some of these embodiments these heights increase progressively from smaller heights to larger heights, so as to stretch the torso gradually. For example, if one focuses on a certain two of the compressions, driving the chest-lifting device according to the motion-time profile may cause the chest-lifting device to:

a) lift the chest to a first height above the resting height before the certain two compress 10 ns,
b) lift the chest to a second height above the resting height that is at least 5% higher than the first height between the certain two compressions, and
c) lift the chest to a third height above the resting height that is at least 5% higher than the second height after the certain two compressions.

Examples are now described, where the liftings of the chest can be characterized in terms of when they occur with respect to the compressions, and especially with respect to the certain two compressions. In some instances, the certain two compressions are successive, in others not. In some instances the chest is lifted additional times between when it is lifted to the first height and when it is lifted to the second height. In other instances, it is not.

Figure 18:
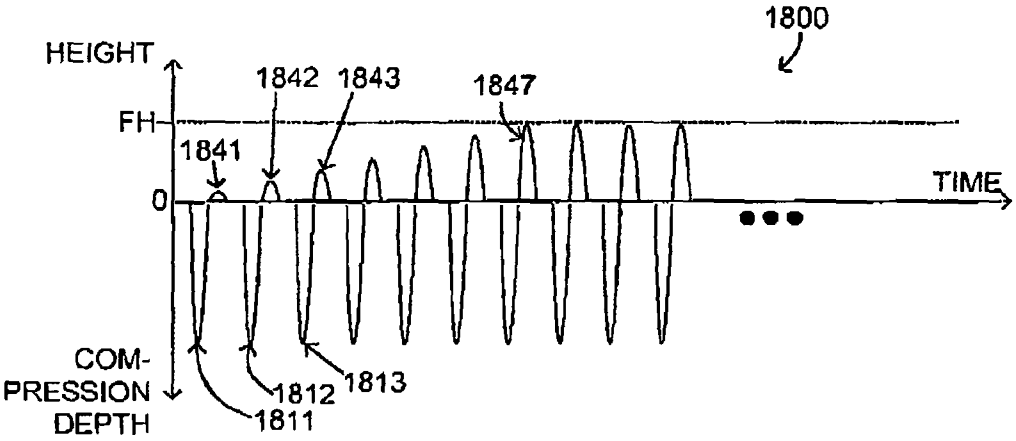
FIG. 18 is a time diagram illustrating a sample motion-time profile according to embodiments, where lifting the chest to the full height is performed gradually.

FIG. 18 is a time diagram of a sample motion-time profile 1800, for illustrating embodiments where the chest is lifted to ascending heights between compressions. In the vertical axis, the positive upward pointing semi-axis indicates height above the resting height, while the negative downward pointing semi-axis indicates compression depth.

In FIG. 18, compressions 1811, 1812, 1813, . . . all reach substantially the same depth. Compressions 1812, 1813 may be considered to be the certain two compressions. The chest is lifted above the resting height (0) in liftings 1841, 1842, 1843, . . . , 1847, . . . . It will be appreciated that liftings 1841, 1842, 1843 can reach heights that can be as described above for the first, second and third heights. Full height FH is reached for the first time at lifting 1847.

Figure 19:
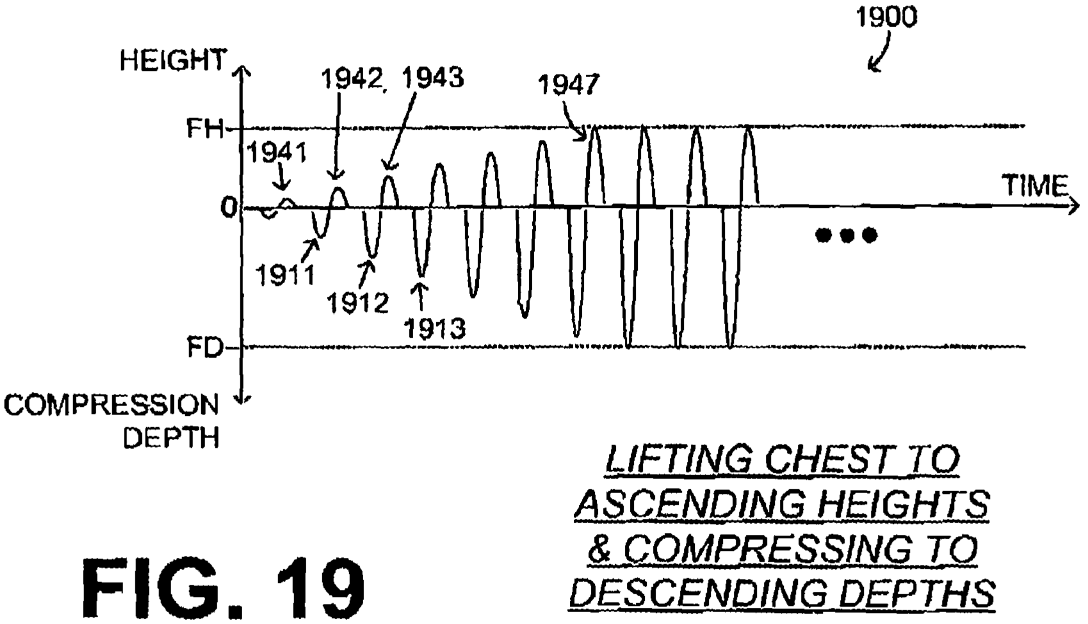
FIG. 19 is a time diagram illustrating sample motion-time profile according to embodiments, which is a variation of the motion-time profile of FIG. 18.

FIG. 19 is a time diagram of a sample motion-time profile 1900, with axes similar to those of FIG. 18, for illustrating embodiments where the chest is lifted to ascending heights and compressed to descending depths. Compressions 1911, 1912, 1913, reach progressively deeper depths, which may reduce reperfusion injury. Any two of them may be considered to be the certain two compressions. The depths are called descending because they reach progressively lower; in fact, their magnitudes are progressively increasing.

In FIG. 19, the chest is lifted above the resting height (0) in liftings 1941, 1942, 1943, . . . , 1947, . . . . Liftings 1941, 1942, 1943 can reach heights that can be as described above for the first, second and third heights. Full height FH is reached for the first time at lifting 1947.

Figure 20:
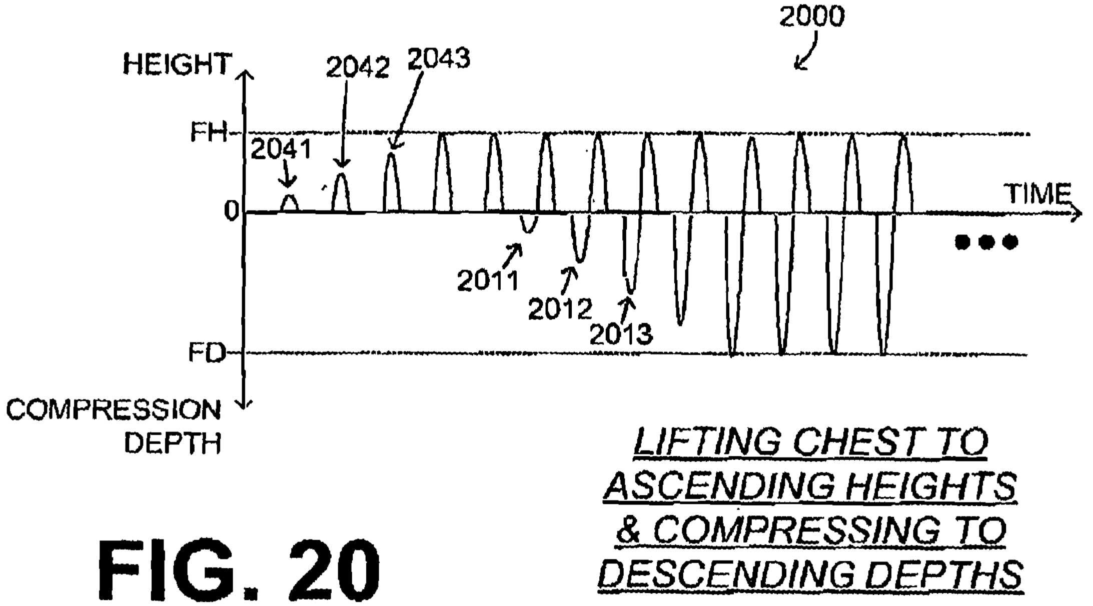
FIG. 20 is a time diagram illustrating sample motion-time profile according to embodiments, Which is another variation of the motion-time profile of FIG. 18.

FIG. 20 is a time diagram of a sample motion-time profile 2000, with axes similar to those of FIG. 18, for illustrating embodiments where the chest is lifted to ascending heights and compressed to descending depths. The chest is lifted above the resting height (0) in liftings 2041, 2042, 2043 . . . . Liftings 2041, 2042, 2043 can reach heights that can be as described above for the first, second and third heights. Compressions 2011, 2012, 2013, reach progressively deeper depths, as in FIG. 19, except that they start after the liftings have reached their full height FH.

Some of these features may be programmable if a user interface is provided. For example, the user interface can be configured to receive a configuration input, and one or more of the first, second and third heights may become adjusted responsive to the configuration input. For another example, the user interface can be configured to receive a cancel input, and the second and the third heights may become substantially the same responsive to the cancel input being received.

The first, second and third heights can be determined with reference to the resting height. In some embodiments, a value for the resting height is input, and the second height becomes determined in response to the input value for the resting height. The resting height may be detected, and the value for the resting height could be determined from the detection. The resting height could be detected before any of the compressions are performed.

FIG. 21 shows a flowchart 2100 for describing methods according to embodiments. The methods of flowchart 2100 may also be practiced by embodiments described elsewhere in this document, such as CPR machines that include a compression mechanism, a chest-lifting device and a driver system. In addition, the operations of flowchart 2100 may be enriched by the variations and details described elsewhere in this document.

The operations of flowchart 2100 may be performed by driving, for example via the driver system. Driving can be of the compression mechanism, automatically according to a motion-time profile. Such driving may cause the compression mechanism to perform at least a certain two compressions, of the type described above. Driving can also be of the chest-lifting device according to the motion-time profile, concurrently with driving the compression mechanism. Such driving may cause the chest to be compressed and lifted.

According to an operation 2110, the chest-lifting device may be driven so as to lift the chest to the first height. Operation 2110 may take place before operations 2120 and 2140.

According to other operations 2120, 2140, the compression mechanism may be driven so as to cause a first certain compression and a second certain compression, respectively.

According to another operation 2130, the chest-lifting device may be driven so as to lift the chest to a second height above the resting height. The second height can be at least 5% higher than the first height. Operation 2130 may take place between the certain two compressions of operations 2120, 2140.

According to another operation 2150, the chest-lifting device may be driven so as to lift the chest to a third height above the resting height. The third height can be at least 5% higher than the second height. Operation 2150 may take place after the certain two compressions of operations 2120, 2140.

In some embodiments, a CPR machine includes a height input port that is configured to receive a height input. The driver system can be configured to drive the compression mechanism and the chest-lifting device according to the motion-time profile as described previously. In addition, driving the chest-lifting device according to the motion-time profile may cause the chest-lifting device to lift the chest to a full height above the reference elevation level, and the full height may be determined from the received height input.

The height input port may be implemented in a number of ways. It can be external, fix receiving data from outside the CPR machine. It can be part of a user interface. It can be internal, implemented within circuits. In some embodiments, a user interface may be provided, which can be configured to receive a patient input. The received height input may be determined from the received patient input. In some instances, the patient input is itself the height input.

Figure 22:
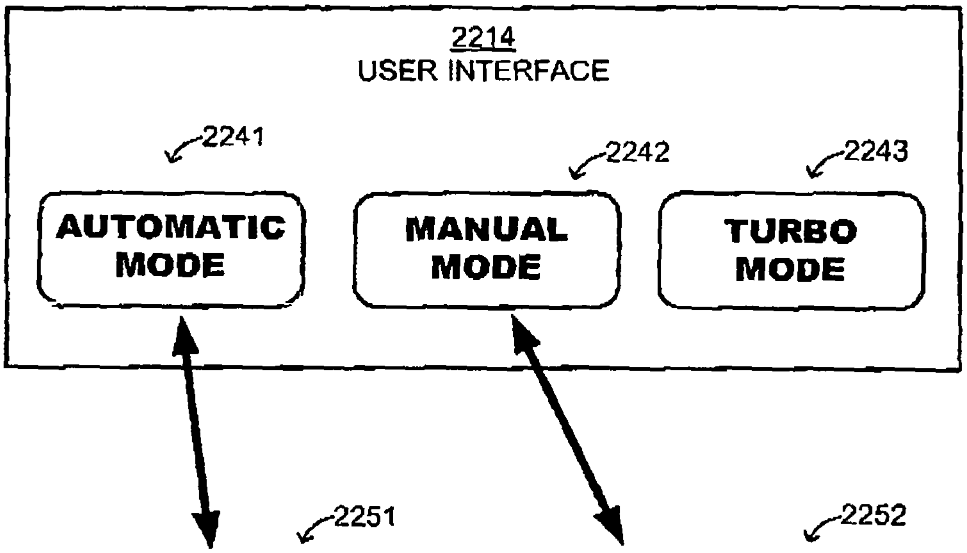
FIG. 22 is a composite diagram of a sample portion of a user interface according to embodiments, and of parameters that are controlled by actuators in the user interface.

FIG. 22 shows an example of a user interface 2214 that may be provided for the operation of a CPR machine according to embodiments. User interface 2214 has actuators 2241, 2242, 2243, which can be physical pushbuttons, buttons on a touchscreen, settings of a dial, and so on.

Actuator 2241 can be labeled "AUTOMATIC MODE", and may control operational parameters in an AUTOMATIC MODE, of which only a set 2251 is shown. In other words, if actuator 2241 is actuated, then all the operational parameters are set in a single setting.

In the example of FIG. 22, parameters 2251 include whether prior compressions have been received by the patient (2251A), with a sample value of YES/NO; an amount of a delay to start lifting the chest after compressions start (as is explained later in this document) (2251B), with a sample value of 30 sec; the full height for lifting during active decompression (2251C), with a sample value of 3 cm, which can be the parameter described above; the time to achieve full height (2251D) if the heights are expected to increase progressively, with a sample value of 30 sec; the lifting waveform shape, whether sinusoidal (S-S), square, or other (2251E); and how often to lift, whether every 1 compression or more compressions than one (2251F), a YES/NO input as to whether a target compression depth/and or decompression height are to computed by the CPR machine (2251G) as described later; and a size value for the patient, such as estimated weight (2251H), if 2251G is YES. It will be recognized that parameters 2251 are mostly related to the operation of the chest-lifting device, while other parameters may deal with the compressions, the duty cycle, etc.

It will be recognized that these operational parameters control the motion-time profile. It will be further recognized that if the time to achieve the full height is 5 sec or longer, than the heights will progressively increase, and become the above described first, second and third heights. In addition, even the third height can be less than the full height, for example as was the case in FIG. 18.

Returning to FIG. 22, actuator 2242 can be labeled "MANUAL MODE", and may control a set 2252 of operational parameters in a MANUAL MODE. i.e. if actuator 2242 is actuated, then each of the shown operational parameters 2251A-2251F may be set individually. Of course, a starting value may be proposed by the system, and so on.

Actuator 2243 can be labeled "TURBO MODE", and may be used for a TURBO MODE, where parameters can be chosen to increase aggressively. Such may prove beneficial, for example if the patient does not seem to respond to standard protocols of CPR therapy under the AUTOMATIC MODE or the MANUAL MODE, and higher risks are thus justified.

The height input may be received in additional ways. For example, the resting height may be detected, and the received height input may be determined from the detected resting height. The resting height may be detected even before any of the compressions are performed.

Figure 23:
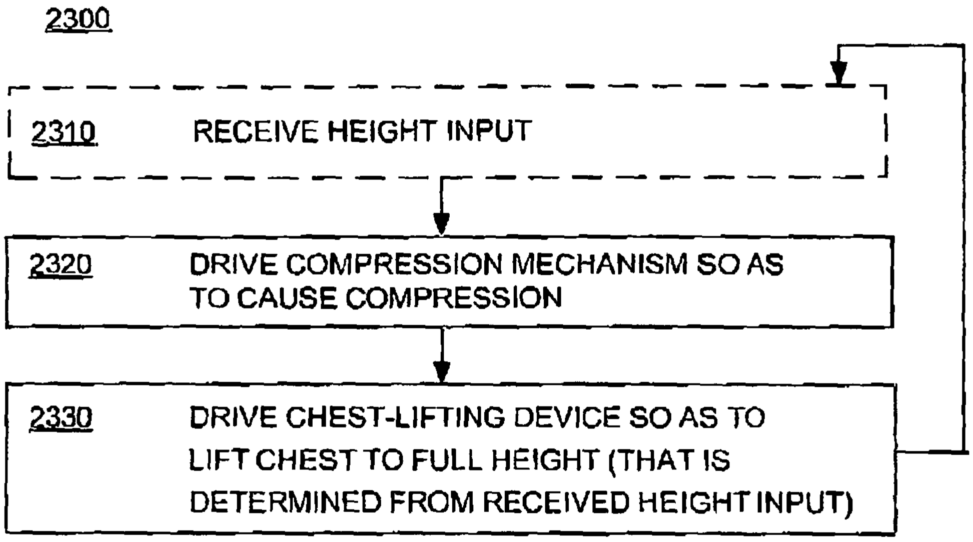
FIG. 23 is a flowchart for illustrating methods according to embodiments.

FIG. 23 shows a flowchart 2300 for describing methods according to embodiments. The methods of flowchart 2300 may also be practiced by embodiments described elsewhere in this document, such as CPR machines that include a compression mechanism, a chest-lifting device and a driver system. In addition, the operations of flowchart 2300 may be enriched by the variations and details described elsewhere in this document.

According to an optional operation 2310, a height input may be received. The height input may be received by a height input port.

According to another operation 2320, the compression mechanism may be driven so as to cause the compression mechanism to perform a compression. The compression mechanism can be driven by the driver system.

According to another operation 2330, the chest-lifting device may be driven so as to cause the chest-lifting device to lift the chest to a full height above a reference elevation level. The full height may be determined from the received height input.

Execution may then return to operation 2310, and thus operations 2310, 2320, 2330 may be performed repeatedly, automatically, according to a motion-time profile. If optional operation 2310 is indeed performed and a new height input is thus received, then a subsequent execution of operation 2330 may be performed to an updated full eight that is determined from the received height input.

In some of embodiments, a chest-lifting device is included. The driver system is configured to drive the compression mechanism, and further to cause the chest-lifting device to lift the chest above its resting height. Lifting the chest may start after a lifting delay after the compressions from the compression mechanism have started being performed. The lifting delay may be part of the motion-time profile, for example as hinted in parameters 2251, while other parameters may be similar or different.

In such embodiments, the chest may be thus lifted by the chest-lifting device during at least one of the releases, even before the chest is lifted above the resting height. In some of these embodiments, the chest may be thus lifted above the resting height, for example by at least 0.5 cm. Examples are now described.

Figure 24:
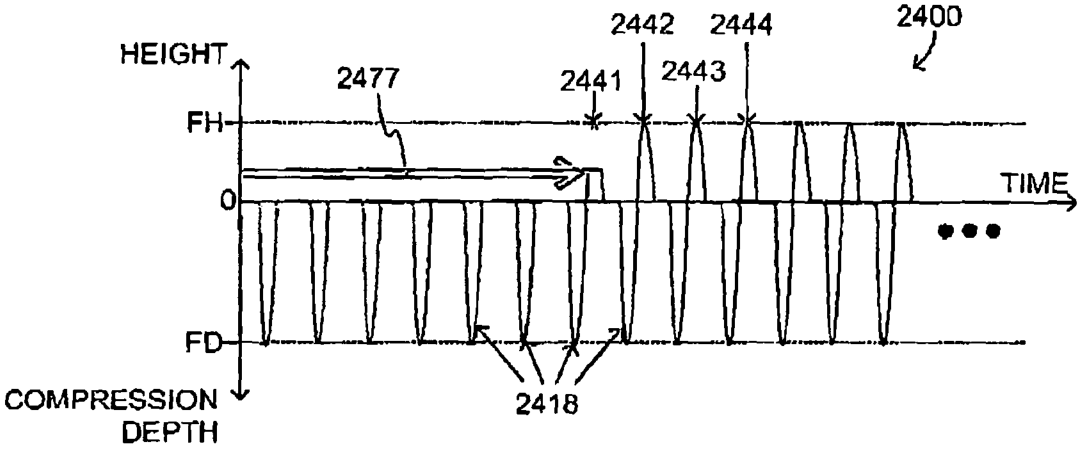
FIG. 24 is a time diagram illustrating that starting lifting the chest may be delayed according to embodiments.

FIG. 24 is a time diagram 2400, which shows a motion-time profile with axes similar to those of FIG. 18, for illustrating embodiments where a chest is compressed, and lifted but with a lifting delay. Compressions 2418 are performed, starting at time 0. In this example, all compressions 2418 are of the same depth (FD), but that need not be the case; for example, the compressions could start by becoming progressively deeper until they reach full depth FD. In addition, liftings 2441, 2442, 2443, 2444, . . . start after a lifting delay 2477.

Lifting delay 2477 may be beneficial because, at the beginning of a resuscitation session, if cardiac arrest has occurred a minute or more before beginning of compressions, or possibly if there has been a gap in compressions of at least 30-60 seconds, the right heart may have become distended. Since the active decompression component of CPR increases return of blood from the veins to the right heart, and since the right heart may be already over full at the beginning of compressions. Lifting delay 2477 may be at least 15 sec, at least 45 sec, etc. Good values for it can be say, 30 to 120 seconds.

Figure 25:
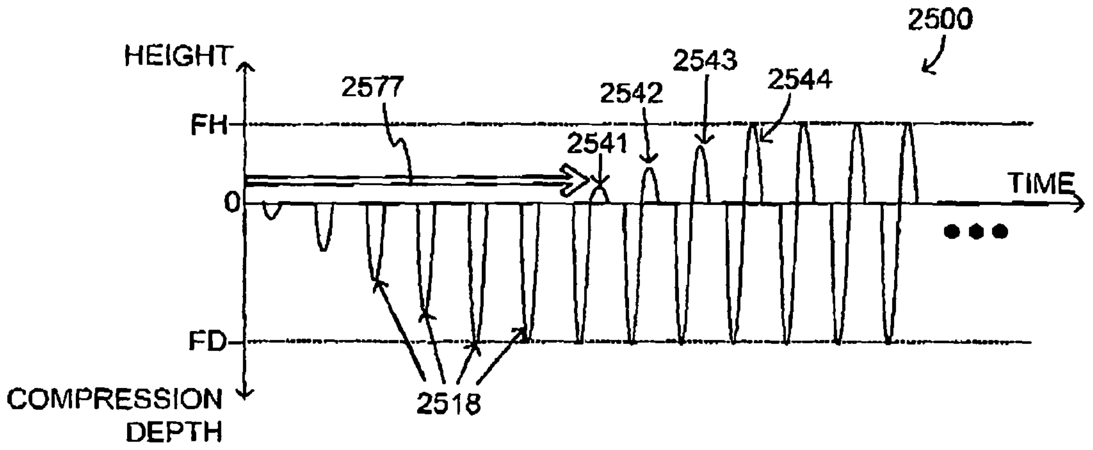
FIG. 25 is a time diagram illustrating a variation of the lifting of FIG. 24 according to embodiments.

FIG. 25 is a time diagram 2500, which shows a motion-time profile with axes similar to those of FIG. 18, for illustrating embodiments where a chest is compressed, and lifted but with a lifting delay. Compressions 2518 are performed, starting at time 0, and starting by becoming progressively deeper until they reach full depth FD. In addition, liftings 2541, 2542, 2543, 2544, . . . start after a lifting delay 2577.

In corresponding methods for a CPR machine, operations may include driving, via a driver system, a compression mechanism automatically according to a motion-time profile so as to cause the compression mechanism to repeatedly perform compressions and releases. At least two of the compressions thus compress the patient's chest by at least 2 cm downward from the resting height, similarly with other operations and methods in this description. Operations may further include concurrently driving a chest-lifting device according to the motion-time profile so as to cause, after a lifting delay after the compressions have started being performed, the chest-lifting device to lift the chest with respect to a reference elevation level while none of the compressions is being performed. The lifting delay can be as above.

CPR machines according to embodiments may further cooperate with ventilators, so as to synchronize the lifting of the chest by the chest-lifting device with an infusion of air by the ventilator. Examples are now described.

Figure 26:
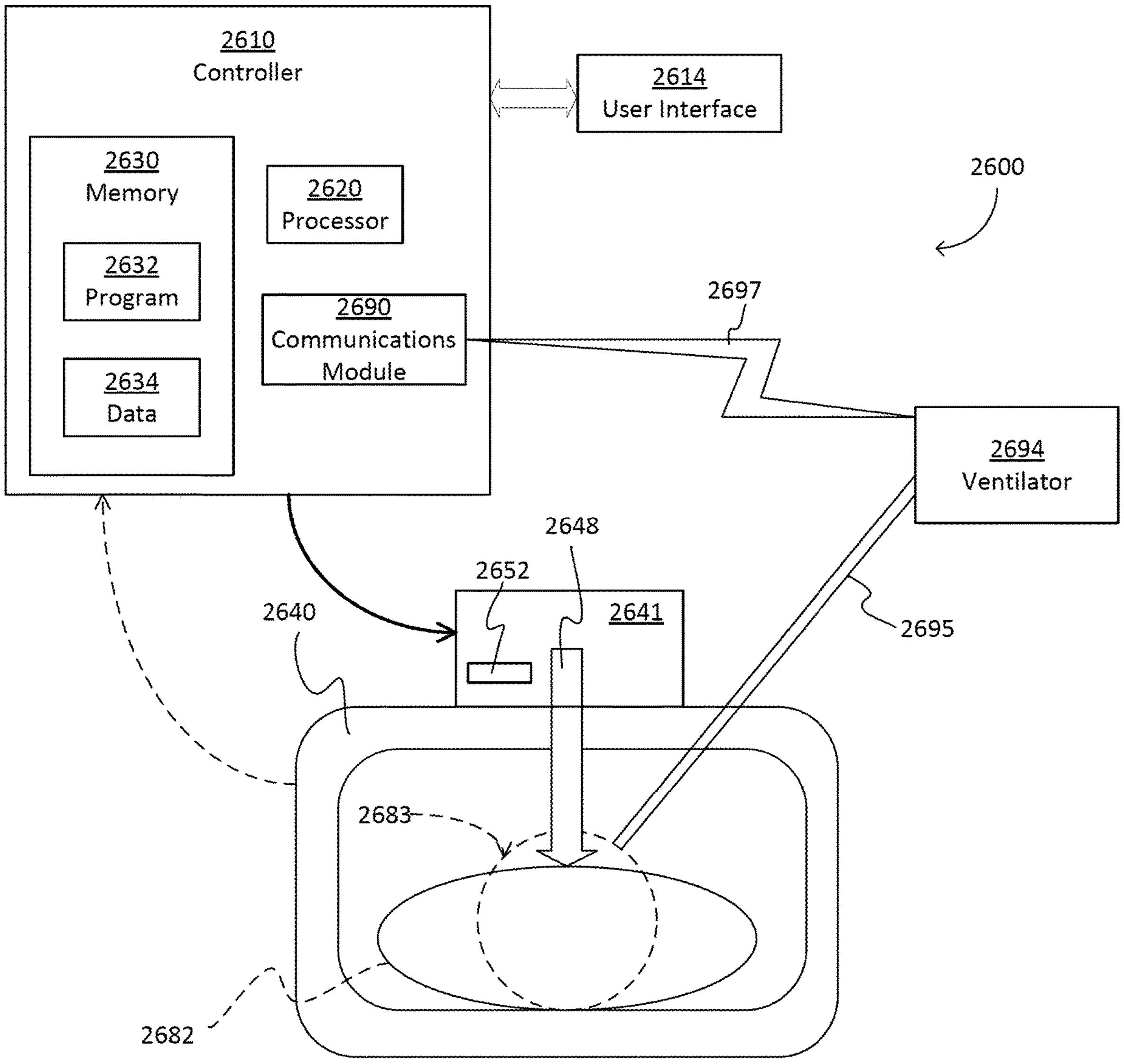
FIG. 26 is a diagram illustrating components of an abstracted CPR machine cooperating with a medical ventilator according to embodiments.

FIG. 26 is a diagram of components 2600 of an abstracted CPR machine according to embodiments. The abstracted CPR machine can be configured to cooperate with a ventilator 2694 according to embodiments.

Many of components 2600 are similar to components 100 in FIG. 1. More particularly, components 2600 include a retention structure 2640, in which a patient 2682 having a head 2683 may be placed supine. Components 2600 also include a compression mechanism 2648, a chest-lifting device 2652, a driver 2641, and a controller 2610. Controller 2610 may include a processor 2620 and a memory 2630, which stores programs 2632 and data 2634. Components 2600 may further include or cooperate with a communication module 2690 and a user interface 2614.

Ventilator 2694 includes a tube 2695 coupled to the mouth of patient 2682. Ventilator 2694 also includes a communication module that can establish a communication link 2697 with communication module 2690. Communication link 2697 may be wireless or wired, for example by connecting a cable. Signals (not shown) may be exchanged via communication link 2697. The CPR machine and ventilator 2694 may cooperate, for example by one of them controlling the other, etc.

In embodiments, the CPR machine with components 2600 is configured to operate in cooperation with ventilator 2694. Ventilator 2694 can be configured to transmit ventilator signals in conjunction with biasing air into the mouth of patient 2682 though tube 2695. These ventilator signals may communicate exactly when air is being biased, which results in an infusion or air, or breath. Ventilations can be timed to expand the chest during chest lifting, to reduce the required lifting force. In embodiments, the compressions and the liftings may be synchronized with the rate of the respirator. The compression force and the lifting force can be adjusted depending on whether the respirator has filled the patient lungs. Caution should be exercised in case the chest resting height becomes redefined if air has been pushed into the patient's lungs.

Driver system 2641 can be further configured to drive chest-lifting device 2652 in response to the received ventilator signals, so as to cause chest-lifting device 2652 to lift the chest of patient 2682 to a certain height above a reference elevation level. Lifting can be at a certain moment when the air is being biased into the patient's mouth.

Of course, the chest can be thus lifted at a time between two compressions. The chest can be thus lifted in advance of its decompression, and even above the resting height, for example by at least 0.5 cm above the resting height. In some embodiments, the certain height can even be determined from the ventilator signals.

In some embodiments, the ventilator is configured to receive timing signals from the CPR machine, and bias air accordingly. For example, in FIG. 26, similarly to what was described previously, driver system 2641 can be configured to drive chest-lifting device 2652 so as to cause the chest-lifting device to lift the chest to a height above the reference elevation level. Lifting can be at a certain moment between when the certain two compressions are being performed. In addition, communication module 2690 can be configured to transmit ventilator signals that indicate when the certain moment occurs.

Figure 27:
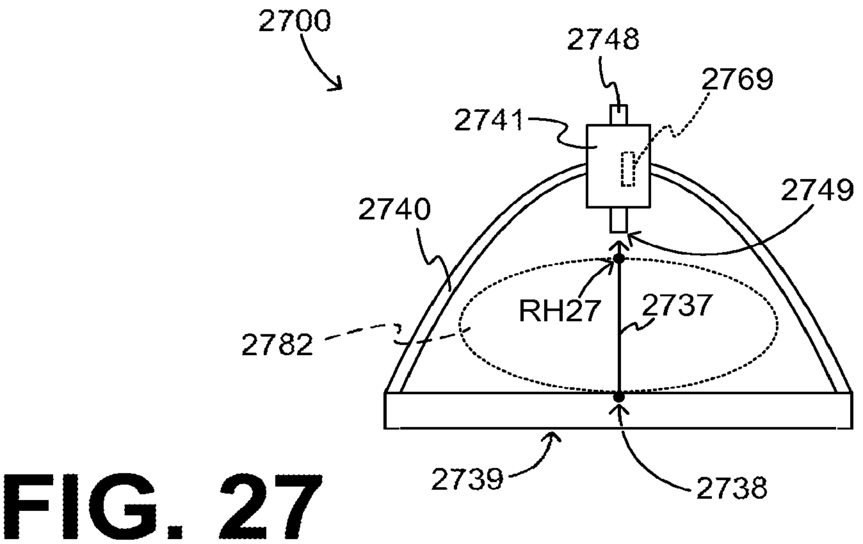
FIG. 27 is a diagram of sample components of a CPR machine according to embodiments where a compression depth is adjusted according to patient size.

FIG. 27 is a diagram of sample components 2700 of a CPR machine intended for use with a patient 2782. Components 2700 include a retention structure 2740 that includes a back plate 2739. Back plate 2739 has a midpoint 2738. Patient 2782 may be placed supine on the plate 2739; when this happens, the chest of patient 2782 thus has a resting height. The resting height can be measured on axis 2737 as the distance between midpoint 2738 and point RH27.

Components 2700 also include a driver system 2741, and a piston 2748 that is coupled to retention structure 2740 via driver system 2741. Piston 2748 is configured to perform, when driven by driver system 2741, compressions alternating with releases on the chest, while patient 2782 is supine on back plate 2739. Piston 2748 has a bottom end 2749 that is configured to be coupled to patient 2782 during the compressions. The coupling can be either by direct contact or via a chest lifting device. The resting height of the chest of patient 2782 is determinable at a moment when none of the compressions is being performed.

Similarly with the description of prior embodiments, driver system 2741 can be configured to drive piston 2748 automatically, so as to cause piston 2748 to repeatedly perform the compressions and the releases. The compressions thus compress the patient's chest to respective compression depths. These compression depths can be defined to be in a downward direction from the resting height. These depths may depend on a size of the patient, as is now described in more detail.

Components 2700 additionally include a position sensor 2769. Position sensor 2769 can be configured to detect a certain distance of bottom end 2749 of piston 2748 to midpoint 2738 of back plate 2739. Accordingly, position sensor 2769 has the opportunity to render a reading for the resting height of the chest. This resting height can be used as a reference, a "proxy", for the size of the patient's body; indeed, the larger the patient, the higher will be the resting height of their chest.

Position sensor 2769 can be implemented in a number of ways. For example, where piston 2748 is driven by driver system 2741, the position sensor need only measure the location of piston 2748 relative to driver system 2741, because driver system 2741 can be fixed relative to retention structure 2740. It is known how to do this location, for example when driver system 2741 drives piston 2748 by a rack and pinion mechanism, etc.

In embodiments, a nominal resting height value can be determined from the detected certain distance. Once determined, the nominal resting height value can be stored in a memory, and so on.

The nominal resting height value can be determined in a number of ways. For example, the CPR machine can further include an actuator, for instance as part of a user interface 114. The actuator can be a physical switch, a key, an image that needs to be manipulated on a touchscreen, and so on. The actuator can configured to be actuated by a rescuer at a certain moment, and the certain distance can be detected at the certain moment. For example, a rescuer may manually lower piston 2748, until bottom end 2749 touches patient 2782 at point RH27. At that time, bottom end 2749 will correspond to the resting height; either it will coincide with it, or it will have a fixed distance from it, for instance if a chest lifting device is included in piston 2748. At that certain moment, the rescuer may actuate the actuator, which signifies to the CPR machine that the detected certain distance corresponds to the resting height. The actuator can advantageously be implemented together with a "START COMPRESSIONS" button or another part of an interface.

For another example, the CPR machine can further include a force sensing system, for example as described elsewhere in this document. The force sensing system can be configured to sense an amount of a compression force exerted by driver system 2741 during the compressions. The compression force will be due to the physical resistance that the chest of patient 2782 will present to the compressions by piston 2748. In embodiments, the certain distance can be detected at a moment when the sensed amount of the compression force indicates that bottom end 2749 is at the resting height of the chest, in other words, reached point RH27. For instance, as part of a session of delivering chest compressions, the CPR machine may lower automatically piston 2748 from a fully retracted position. The initial lowering will initially encounter no resistance from the patient. The resistance will start once the patient's chest is reached at point RH27, which is how the sensed amount of the compression force may indicate that bottom end 2749 is at the resting height of the chest.

Figure 28:
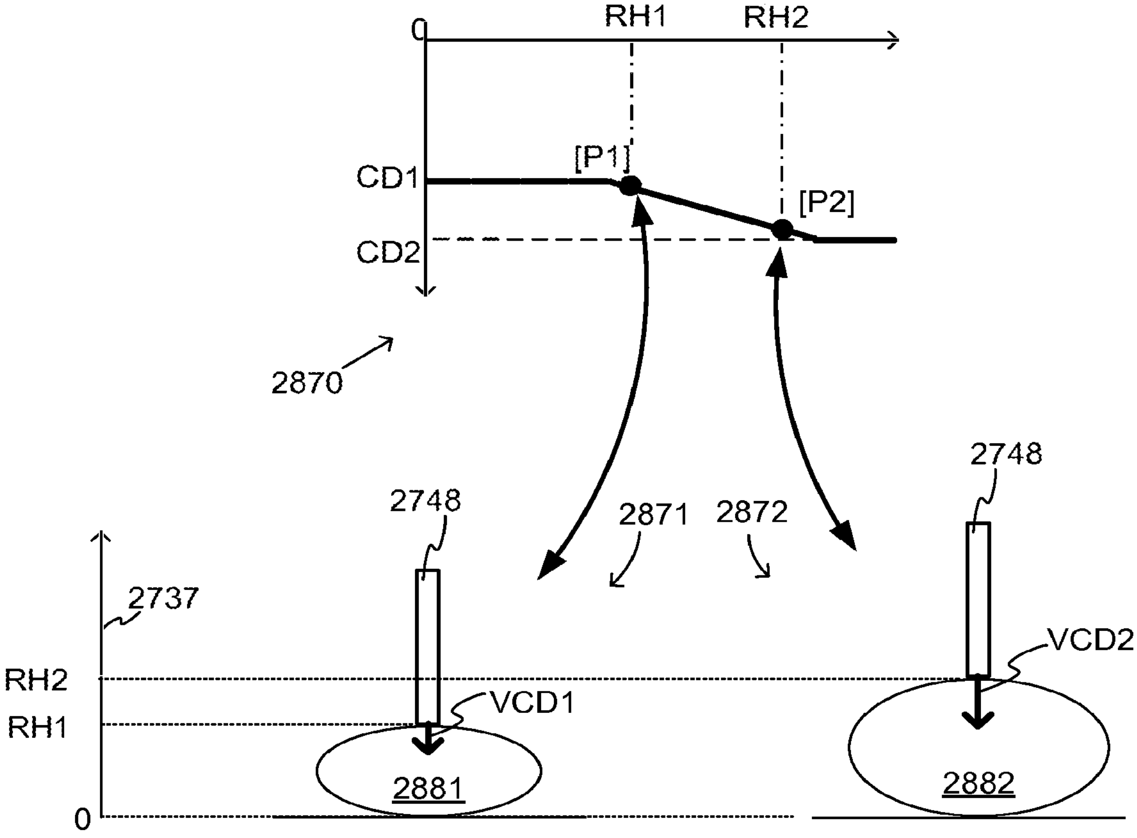
FIG. 28 is a composite diagram of sample components of the CPR machine of FIG. 27, in scenarios where patients of different sizes receive chest compressions of different depths.

FIG. 28 is a composite diagram made from individual diagrams 2870, 2871 and 2872, which are bridged by thick curved arrows and horizontal dotted lines. Piston 2748 is shown against axis 2737 for two scenarios 2871, 2872. In scenario 2871, a smaller patient 2881 has a resting height with a value RHI. Patient 2881 receives compressions represented by a downward-pointing vector VCD1. In scenario 2872, a larger patient 2882 has a resting height with a value RH2, which is larger than RHI. Patient 2882 receives compressions represented by a downward-pointing vector VCD2, which has a magnitude larger than that of VCD1 because the compressions for patient 2882 are deeper than for patient 2881.

In FIG. 28, diagram 2870 shows a possible relationship that can express different behaviors according to embodiments. The horizontal axis plots resting heights. The vertical axis plots compression depths, in a downward direction. Two points P1, P2 represent the behaviors at scenarios 2871, 2872, respectively, as indicated by the thick curved arrows. Values CDI and CD2 are the numerical values of vectors VCDI, VCD2, respectively. For at least a certain range between points P1 and P2, increasing the resting height increases the compression depth. The increase may be linear as shown in the example of FIG. 28, or otherwise. CDI and CD2 may have suitable values, such as 4.0 cm, and 6.0 cm. It will be understood that such values are targets, and the actual depths of the compressions may have small statistical variations among them.

In embodiments, a resting height threshold may be chosen on the horizontal axis of diagram 2870, and a compression depth threshold can be chosen on its vertical axis. The depths of the compressions can be determined in terms of aggregate statistics. One such statistic can be to consider any four of any seven consecutive compressions. For example, the depths of the compressions can be such that, if the nominal resting height value is less than a resting height threshold, then an average depth of compression depths of at least four of any seven consecutive ones of the compressions can be less than a compression depth threshold. However, if the nominal resting height value is larger than the resting height threshold, then the average depth can be at least 15% larger than the compression depth threshold, such as 30% or even higher.

Figure 29:
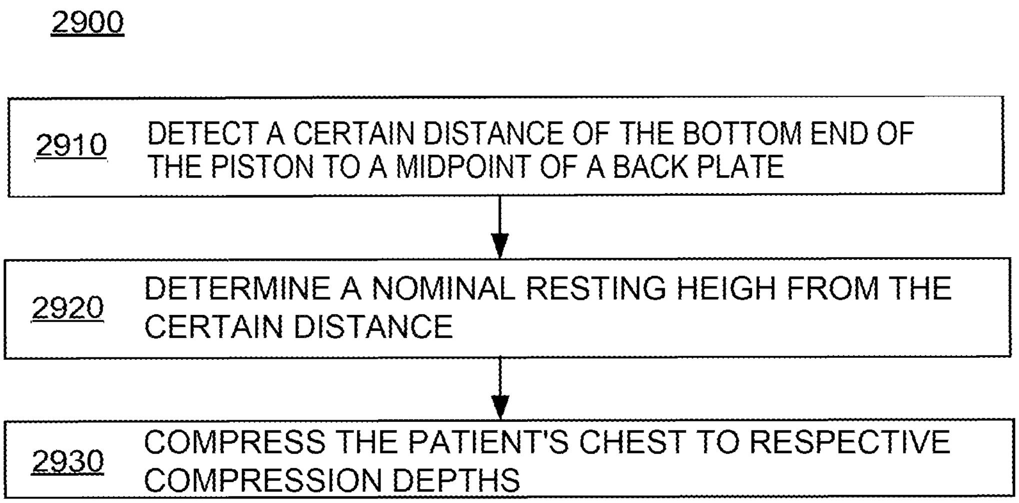
FIG. 29 is a flowchart for illustrating methods according to embodiments.

FIG. 29 shows a flowchart 2900 for describing methods according to embodiments. The methods of flowchart 2900 may also be practiced by embodiments described elsewhere in this document, such as CPR machines that include a retention structure with a back plate, a piston, a driver system, a position detector, etc. In addition, the operations of flowchart 2900 may be enriched by the variations and details described elsewhere in this document.

According to an operation 2910, a certain distance of the bottom end of the piston to a midpoint of a back plate may be detected. Detecting may be performed by a position sensor.

According to another operation 2920, a nominal resting height value may be determined from the certain distance detected at operation 2910.

According to another operation 2930, the piston may be driven, by the driver system, automatically so as to cause the piston to repeatedly perform compressions and releases, the compressions thus compressing the patient's chest to respective compression depths. The compression depths may be as above.

Figure 30:
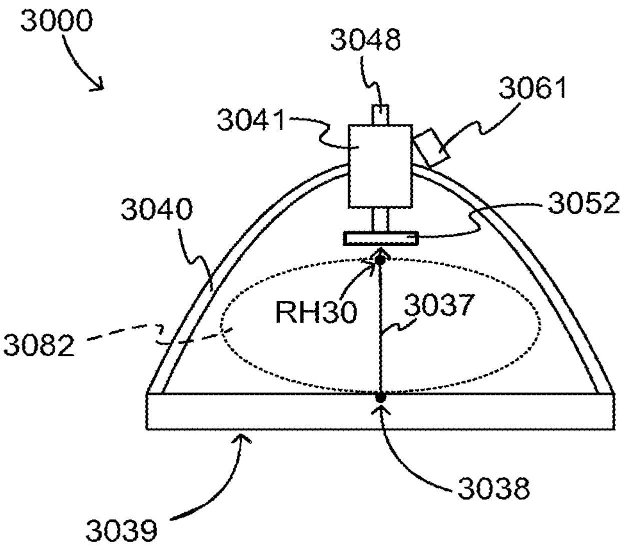
FIG. 30 is a diagram of sample components of a CPR machine according to embodiments where an active decompression height is adjusted according to patient size.

FIG. 30 is a diagram of sample components 3000 of a CPR machine intended for use with a patient 3082. Components 3000 include a retention structure 3040 that includes a back plate 3039. Back plate 3039 has a midpoint 3038. Patient 3082 may be placed supine on the plate 3039; when this happens, the chest of patient 3082 thus has a resting height. The resting height can be measured on axis 3037 as the distance between midpoint 3038 and point RH30.

Components 3000 also include a driver system 3041, and a piston 3048 that is coupled to retention structure 3040 via driver system 3041. Piston 3048 is configured to perform, when driven by driver system 3041, compressions alternating with releases on the chest, while patient 3082 is supine on back plate 3039.

Components 3000 moreover include a chest-lifting device 3052 coupled to piston 3048. In the particular example of FIG. 30, chest-lifting device 3052 is depicted as a suction cup, but other implementations are also possible. Piston 3048 has a bottom end, to which suction cup 3052 is attached, but that is not necessary. Indeed, other types of chest lifting devices might not attach to the bottom end of piston 3048. The bottom end of piston 3048 can be configured to be coupled to patient 3082 during the compressions. The coupling can be either by direct contact or via chest lifting device 3052. The resting height of the chest of patient 3082 is determinable at a moment when none of the compressions is being performed.

Similarly with the description of prior embodiments, driver system 3041 can be configured to drive piston 3048 automatically, so as to cause piston 3048 to repeatedly perform the compressions and the releases. Driver system 3041 can be configured to further drive piston 3048 so as to cause chest-lifting device 3052 to lift the chest while none of the compressions is being performed. The chest can thus be lifted repeatedly to resulting heights above the resting height. These heights may depend on a size of the patient, as is now described in more detail.

Components 3000 also include an input mechanism 3061. Input mechanism 3061 can be configured to input a size value for a size of patient 3082, such as from a rescuer. Moreover, a nominal resting height value may be determined from the size value. This way, an adjustment in the height of the decompressions above the resting height can be made, which ultimately depends on the size of the patient.

The input mechanism may be implemented in a number of ways. In some embodiments, the CPR machine also includes a processor, such as a microprocessor, etc. The input mechanism can further include a user interface, such as user interface 114. The user interface can be configured to input the size value from a rescuer. An example was seen with reference to FIG. 22, where a size value for the patient 2251H is 80 kg. The processor can be configured to compute a target height from the size value, for example by a computation, looking up a table, and so on. Accordingly, the average height can be within 10%, or even within 5%, of the target height.

In other embodiments, the input mechanism includes a position sensor such as was described above. The position sensor may detect a certain distance of the bottom end of the piston to the midpoint of the back plate, and the size value can be determined from the certain distance. There can be an actuator, or a force sensing system, etc., as described above.

Figure 31:
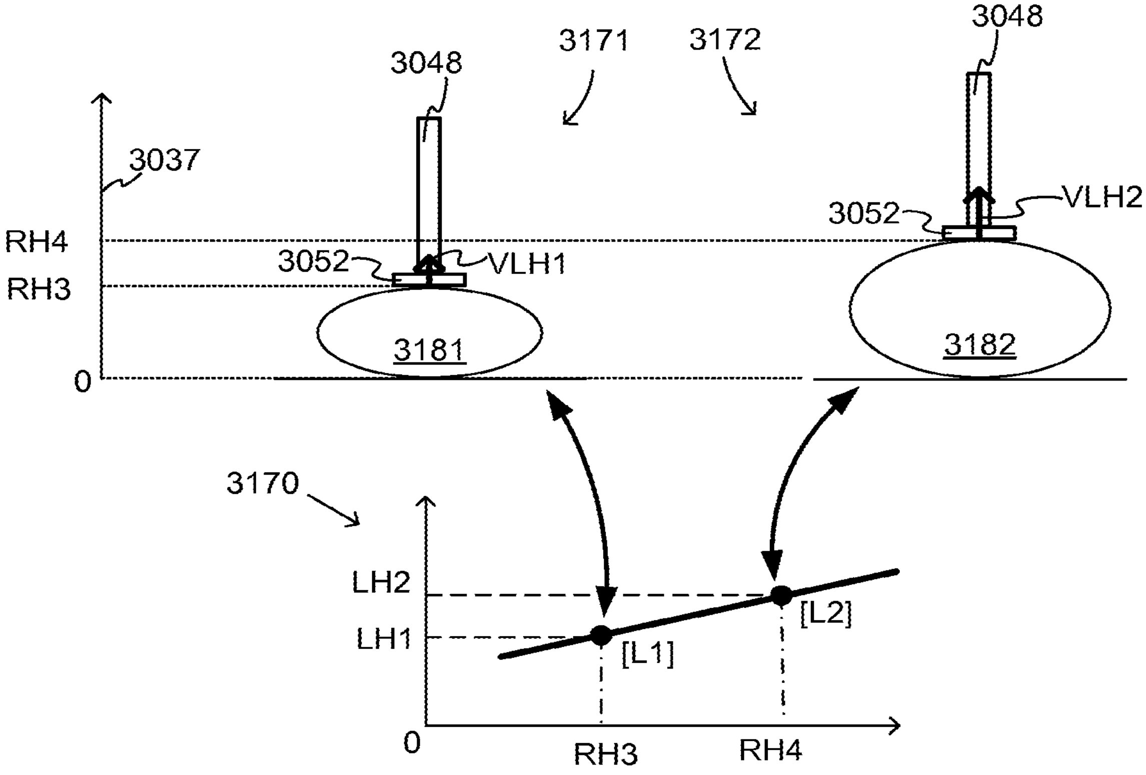
FIG. 31 is a composite diagram of sample components of the CPR machine of FIG. 30, in scenarios where patients of different sizes receive chest compressions of different depths.

FIG. 31 is a composite diagram made from individual diagrams 3170, 3171 and 3172, which are bridged by thick curved arrows and horizontal dotted lines. Piston 3048 is shown against axis 3037 for two scenarios 3171, 3172. In scenario 3171, a smaller patient 3181 has a resting height with a value RH3. Patient 3181 receives compressions, and is also lifted above resting height RH3. These liftings are represented by an upward-pointing vector VLH1. In scenario 3172, a larger patient 3182 has a resting height with a value RH4, which is larger than RH3. Patient 3182 receives compressions, and is also lifted above resting height RH4. These linings are represented by an upward-pointing vector VLH2, which has a magnitude larger than that of VLH1 because the liftings for patient 3182 are higher than for patient 3181.

In FIG. 31, diagram 3170 shows a possible relationship that can express different behaviors according to embodiments. The horizontal axis plots resting heights. The vertical axis plots lifting heights that result from the liftings, above the resting height. Two points L1, L2 represent the behaviors at scenarios 3171, 3172, respectively, as indicated by the thick curved arrows. Values LH1 and LH2 are the numerical values of vectors VLH1, VLH2, respectively. For at least a certain range between points L1 and L2, increasing the resting height increases the height of the liftings above the resting height. The increase may be linear as shown in the example of FIG. 31, or otherwise. LH1 and LH2 may have suitable values, such as 1.5 cm, and 2.5 cm.

In embodiments, a resting height threshold may be chosen on the horizontal axis of diagram 3170, and a lifting height threshold can be chosen on its vertical axis. The resulting heights can be determined in terms of aggregate statistics. One such statistic can be to consider any four of any seven consecutive times the chest is lifted. For example, the heights resulting from thus lifting the chest are such that, if the nominal resting height value is less than a resting height threshold, then an average height of heights resulting from thus lifting the chest at least four of any seven consecutive times can be less than a lifting height threshold. However, if the nominal resting height value is larger than the resting height threshold, then the average height is at least 25% larger than the lifting height threshold, or even larger, such as 40% larger.

Figure 32:
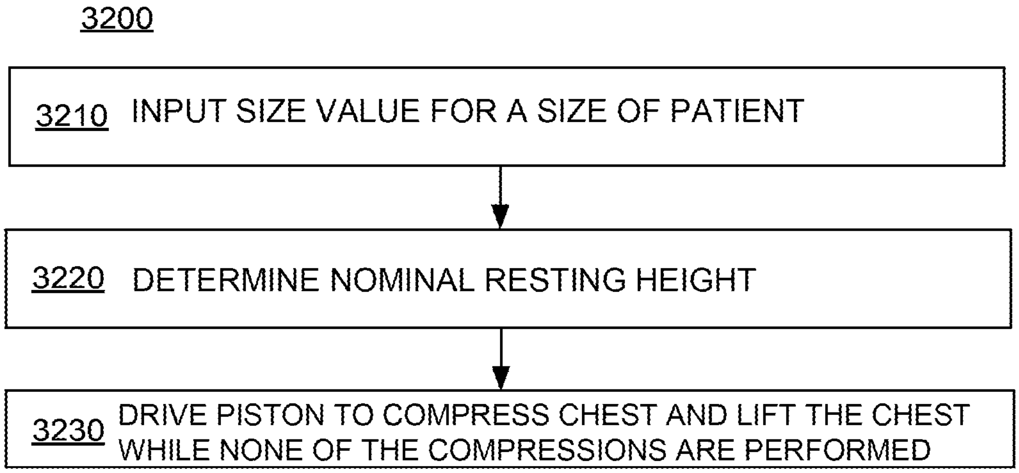
FIG. 32 is a flowchart for illustrating methods according to embodiments.

FIG. 32 shows a flowchart 3200 for describing methods according to embodiments. The methods of flowchart 3200 may also be practiced by embodiments described elsewhere in this document, such as CPR machines that include a retention structure with a back plate, a piston, a chest-lifting device, a driver system, an input mechanism, etc. In addition, the operations of flowchart 3200 may be enriched by the variations and details described elsewhere in this document.

According to an operation 3210, a size value for a size of the patient may be input. Inputting can be, for example, via the input mechanism by a rescuer using the CPR machine.

According to another operation 3220, a nominal resting height value may be determined from the size value that was input at operation 3210.

According to another operation 3230, the piston may be driven, by the driver system, automatically so as to cause the piston to repeatedly perform compressions and releases, and to further drive the piston so as to cause the chest-lifting device to lift the chest while none of the compressions is being performed. The chest can thus be lifted repeatedly to resulting heights above the resting height. The resulting heights may be as above.

In the methods described above, each operation can be performed as an affirmative step of doing, or causing to happen, what is written that can take place. Such doing or causing to happen can be by the whole system or device, or just one or more components of it. In addition, the order of operations is not constrained to what is shown, and different orders may be possible according to different embodiments. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily the present invention. Plus, any reference to any prior art in this description is not, and should not be taken as, an acknowledgement or any form of suggestion that this prior art forms parts of the common general knowledge in any country.

This description includes one or more examples, but that does not limit how the invention may be practiced. Indeed, examples or embodiments of the invention may be practiced according to what is described, or yet differently, and also in conjunction with other present or future technologies. Other embodiments include combinations and sub-combinations of features described herein, including for example, embodiments that are equivalent to: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In this document, the phrases "constructed to" and/or "configured to" denote one or more actual states of construction and/or configuration that is fundamentally tied to physical characteristics of the element or feature preceding these phrases and, as such, reach well beyond merely describing an intended use. Any such elements or features can be implemented in any number of ways, as will be apparent to a person skilled in the art after reviewing the present disclosure, beyond any examples shown in this document.

The following claims define certain combinations and subcombinations of elements, features and steps or operations, which are regarded as novel and non-obvious. Additional claims for other such combinations and subcombinations may be presented in this or a related document.

We claim:

1. A Cardio-Pulmonary Resuscitation ("CPR") machine configured to perform chest compressions on a chest of a patient, the chest having a resting height relative to a reference level, the resting height measured when no chest compressions are being performed, the CPR machine comprising:

a compression mechanism;

a chest-lifting device configured to lift the chest; and a driver system configured to drive the compression mechanism and the chest-lifting device according to a motion-time profile so as to cause the chest-lifting device to lift the chest a first distance from the resting height, the driver system further configured to drive only the compression mechanism for a chest-lift delay period and drive the chest-lifting device when the chest-lift delay period has elapsed, wherein the driver system is further configured to lift the chest to a second distance after lifting the chest to the first distance and cause the compression mechanism to not resume performance of compressions until after the chest-lifting device lifts the chest the second distance.

2. The CPR machine of claim 1, wherein the driver system is further configured to begin chest compressions at a first depth and increase chest compressions to a second depth before the chest-lift delay period has elapsed.

3. The CPR machine of claim 1, wherein the chest-lift delay period is 15 seconds.

4. The CPR machine of claim 1, wherein the chest-lift delay period is 45 seconds.

5. The CPR machine of claim 1, wherein the driver system is further configured to alternate driving the compression mechanism to perform compressions and the chest-lifting device to lift the chest.

6. A method for a Cardio-Pulmonary Resuscitation ("CPR") machine to perform chest compressions on a chest of a patient, the chest having a resting height relative to a reference level, the resting height measured when no chest compressions are being performed on the patient, the method comprising:

driving a compression mechanism to perform one or more compressions on the chest for a first time period and a second time period; and driving a chest-lifting device to lift the chest to a first distance from the resting height after the first time period has elapsed and lifting the chest to a second distance after lifting the chest to the first distance, wherein the compression mechanism is driven to resume performance of chest compressions only after the chest-lifting device lifts the chest the second distance.

7. The method of claim 6, wherein driving the compression mechanism comprises compressing the chest to a first depth and increasing to a second depth before the first time period has elapsed.

8. The method of claim 6, wherein driving the compression mechanism for a first time period comprises driving the compression mechanism for 15 seconds.

9. The method of claim 6, wherein driving the compression mechanism for a first time period comprises driving the compression mechanism for 45 seconds.

10. The method of claim 6, wherein driving the compression mechanism to perform the one or more compressions alternates with driving the chest-lifting device to lift the chest.

11. A Cardio-Pulmonary Resuscitation ("CPR") machine configured to perform chest compressions on a chest of a patient, the chest having a resting height relative to a reference level, the resting height measured when no chest compressions are being performed, the CPR machine comprising:

a compression mechanism;

a chest-lifting device configured to lift the chest; and a driver system configured to drive the compression mechanism and the chest-lifting device according to a motion-time profile so as to cause the chest-lifting device to lift the chest a first distance from the resting height, the motion-time profile comprising a first time period and a second time period, and wherein the driver system is further configured to lift the chest to a second distance after lifting the chest to the first distance and cause the compression mechanism to perform compressions in the second period only after the chest-lifting device lifts the chest to the second distance.

12. The CPR machine of claim 11, wherein the driver system is further configured to drive only the compression mechanism during the first time period and drive both the compression mechanism and chest-lifting device during the second time period.

13. The CPR machine of claim 11, wherein the first time period is 15 seconds.

14. The CPR machine of claim 11, wherein the first time period is 45 seconds.

15. The CPR machine of claim 11, wherein the driver system is further configured to begin chest compressions at a first depth and increase chest compressions to a second depth before the first time period has elapsed.

* * * * *